United States Patent
Ostojich

(10) Patent No.: US 10,820,726 B2
(45) Date of Patent: Nov. 3, 2020

(54) FOOD STAND SYSTEM

(71) Applicant: Jasna Ostojich, Park Ridge, IL (US)

(72) Inventor: Jasna Ostojich, Park Ridge, IL (US)

(*) Notice: Subject to any disclaimer, the term of this patent is extended or adjusted under 35 U.S.C. 154(b) by 209 days.

(21) Appl. No.: 16/012,878

(22) Filed: Jun. 20, 2018

(65) Prior Publication Data

US 2019/0387901 A1    Dec. 26, 2019

(51) Int. Cl.
| | |
|---|---|
| *B60P 3/025* | (2006.01) |
| *A47F 10/06* | (2006.01) |
| *G06Q 50/12* | (2012.01) |
| *G06Q 30/06* | (2012.01) |
| *G06Q 20/12* | (2012.01) |
| *A47J 43/00* | (2006.01) |
| *F25D 11/00* | (2006.01) |
| *H04W 84/12* | (2009.01) |

(52) U.S. Cl.
CPC ............ *A47F 10/06* (2013.01); *A47J 43/00* (2013.01); *F25D 11/00* (2013.01); *G06Q 20/12* (2013.01); *G06Q 30/0635* (2013.01); *G06Q 50/12* (2013.01); *A47F 2010/065* (2013.01); *B60P 3/0257* (2013.01); *F25D 2400/12* (2013.01); *F25D 2400/32* (2013.01); *H04W 84/12* (2013.01)

(58) Field of Classification Search
CPC ... A47F 10/06; A47F 2010/065; G06Q 50/12; G06Q 30/0635; G06Q 20/12; A47J 43/00; F25D 11/00; F25D 2400/32; F25D 2400/12; B60P 3/0257; H04W 84/12; A47B 77/02; A47B 77/08
See application file for complete search history.

(56) References Cited

U.S. PATENT DOCUMENTS

| | | | | |
|---|---|---|---|---|
| 2,815,539 A | * | 12/1957 | Schneider | E04B 1/3465 52/31 |
| 2,867,853 A | * | 1/1959 | Lindgren | E04H 1/1222 52/36.2 |
| 3,953,091 A | * | 4/1976 | Shults | A47F 10/06 312/140.2 |
| 4,007,810 A | * | 2/1977 | Weddendorf | A47F 10/06 186/44 |
| 4,114,541 A | * | 9/1978 | Weddendorf | A47B 11/00 108/139 |
| 4,546,578 A | * | 10/1985 | Behrmann | E04B 1/344 296/172 |
| 5,383,703 A | * | 1/1995 | Irvine, III | B60P 3/36 296/24.45 |

(Continued)

OTHER PUBLICATIONS https://www.mykioskey.com/project/mobile-phone-kiosk/ (Year: 2018).*
https://www.aliexpress.com/item/32812065564.html (Year: 2018).*

*Primary Examiner* — Ashford S Hayles
(74) *Attorney, Agent, or Firm* — David Postolski, Esq.; Gearhart Law LLC

(57) ABSTRACT

A food stand system with a plan view in the shape of an incomplete circle, with a flat top surface as a countertop, and a convex customer-facing surface. The stand contains a food preparation appliance having both cooking and refrigeration components. Sensors measure the appliance interior state, and provide data to an automated controller that controls appliance operation to prepare food for consumption.

10 Claims, 22 Drawing Sheets

(56) References Cited

U.S. PATENT DOCUMENTS

| | | | | |
|---|---|---|---|---|
| 5,938,261 | A * | 8/1999 | Faba | B60P 3/0257 |
| | | | | 296/22 |
| 6,158,174 | A * | 12/2000 | Mairs | A45D 29/00 |
| | | | | 52/34 |
| 6,416,101 | B1 * | 7/2002 | Bartch | B60P 3/0257 |
| | | | | 296/168 |
| 6,997,495 | B1 * | 2/2006 | Groezinger | B60P 3/025 |
| | | | | 296/26.15 |
| 7,172,231 | B1 * | 2/2007 | Johnson, II | B60P 3/0257 |
| | | | | 296/168 |
| 8,931,400 | B1 * | 1/2015 | Allen | A47J 36/00 |
| | | | | 99/344 |
| D733,005 | S * | 6/2015 | Erwin | D12/101 |
| 9,328,957 | B1 * | 5/2016 | Feinstein | F25D 31/002 |
| 2005/0103321 | A1 * | 5/2005 | Wishart | A47B 43/00 |
| | | | | 126/25 R |
| 2007/0278766 | A1 * | 12/2007 | Schneider | B62D 63/062 |
| | | | | 280/400 |
| 2010/0034935 | A1 * | 2/2010 | Wally | A47J 37/00 |
| | | | | 426/232 |
| 2012/0146363 | A1 * | 6/2012 | Fiander | B60P 3/341 |
| | | | | 296/216.06 |
| 2012/0325198 | A1 * | 12/2012 | Bacigalupo | B60P 3/0257 |
| | | | | 126/19 M |
| 2013/0033057 | A1 * | 2/2013 | Markham | B60P 3/0257 |
| | | | | 296/22 |
| 2014/0300087 | A1 * | 10/2014 | Bell | A47F 5/108 |
| | | | | 280/651 |
| 2015/0379531 | A1 * | 12/2015 | Christian | G06Q 30/0202 |
| | | | | 705/7.31 |
| 2018/0274256 | A1 * | 9/2018 | El-Wakeel | A47F 11/02 |
| 2020/0093327 | A1 * | 3/2020 | Hua | A47J 36/321 |

\* cited by examiner

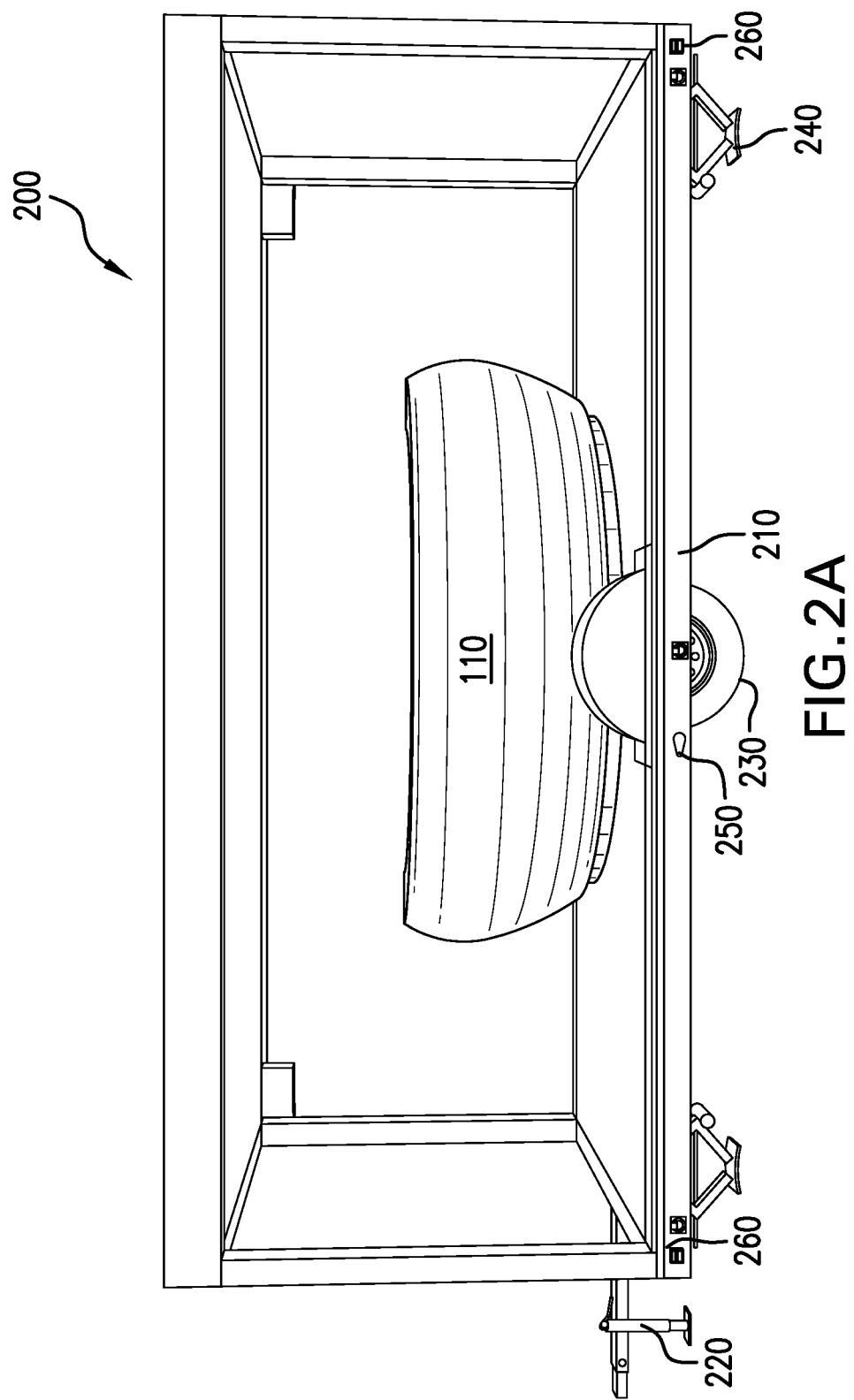

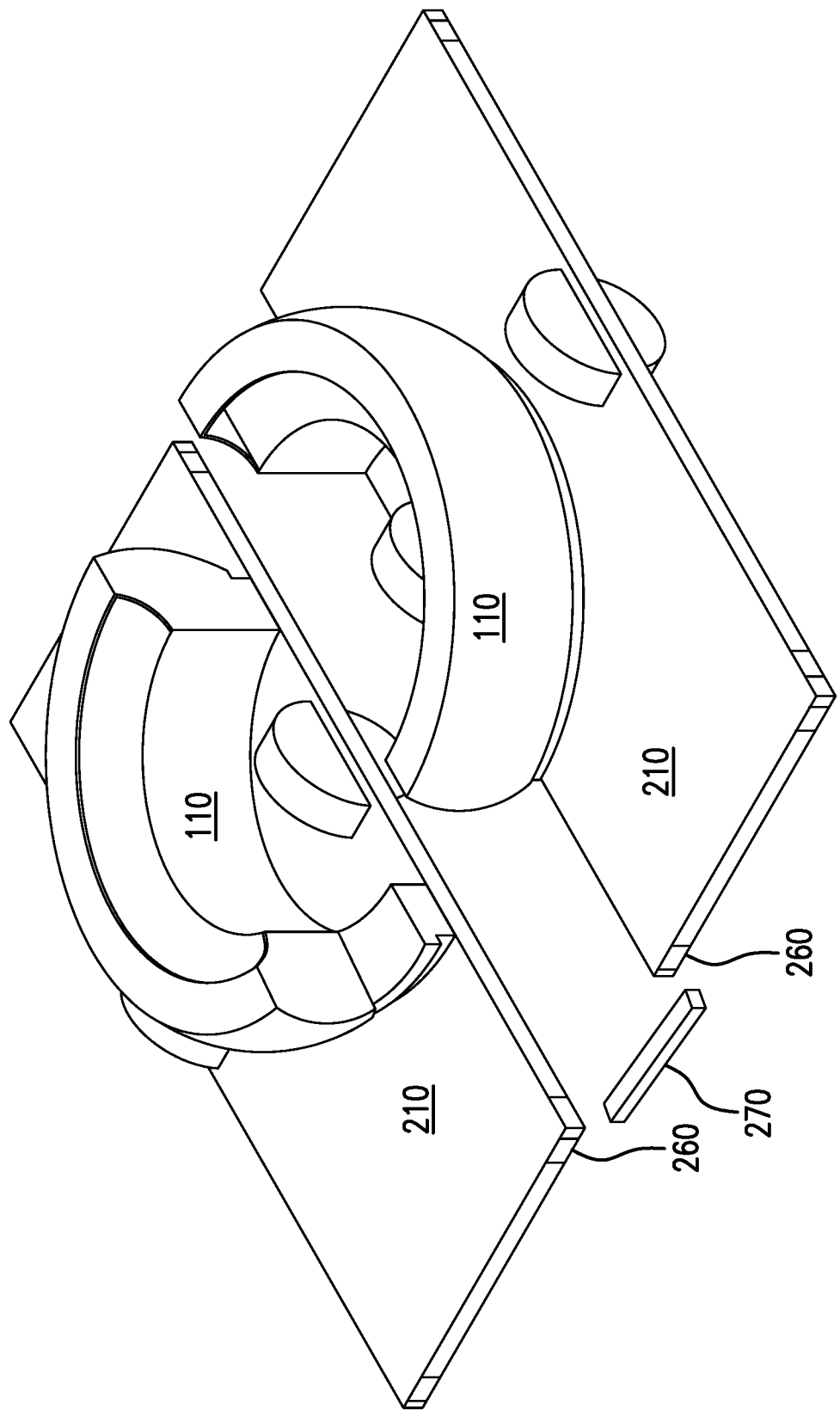

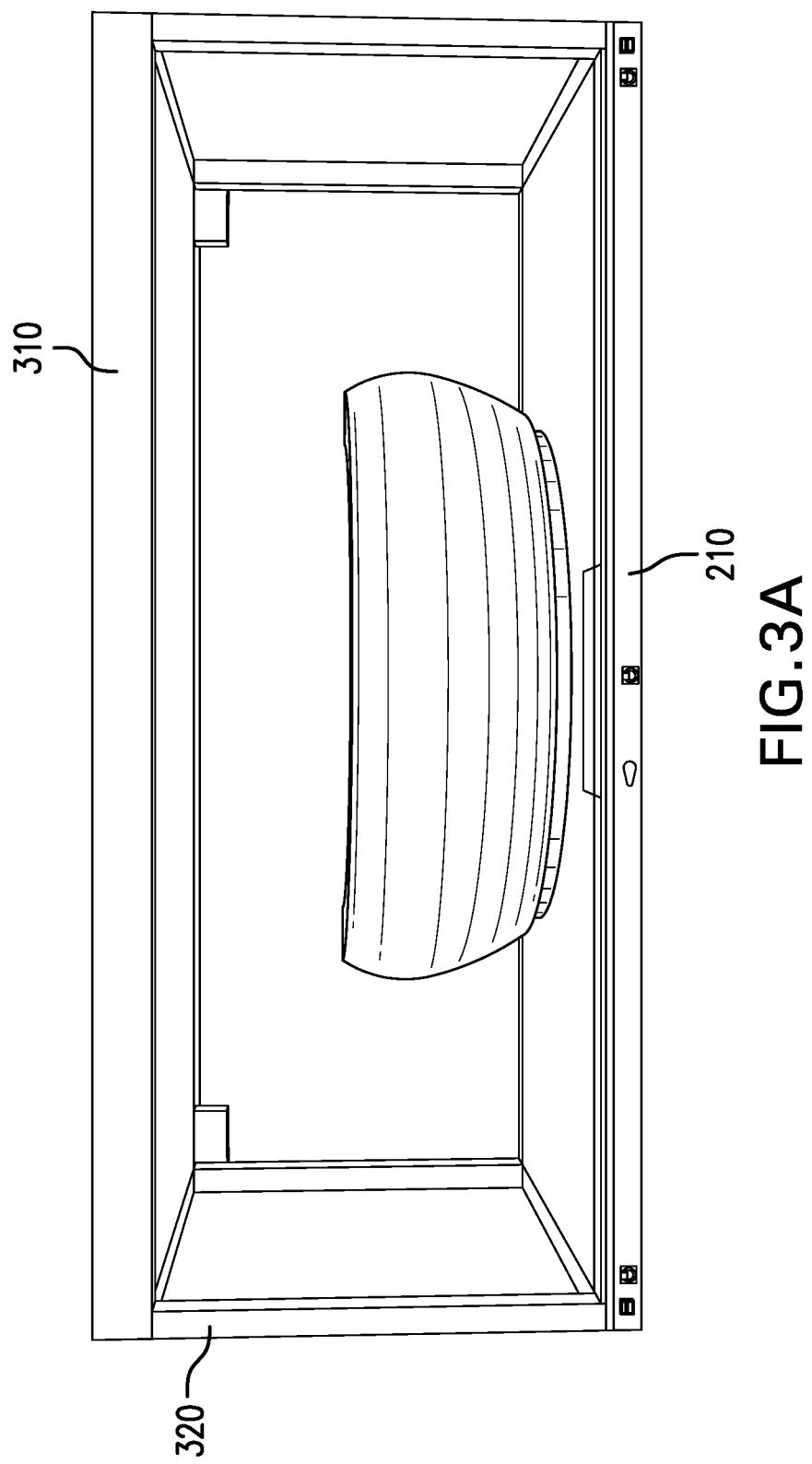

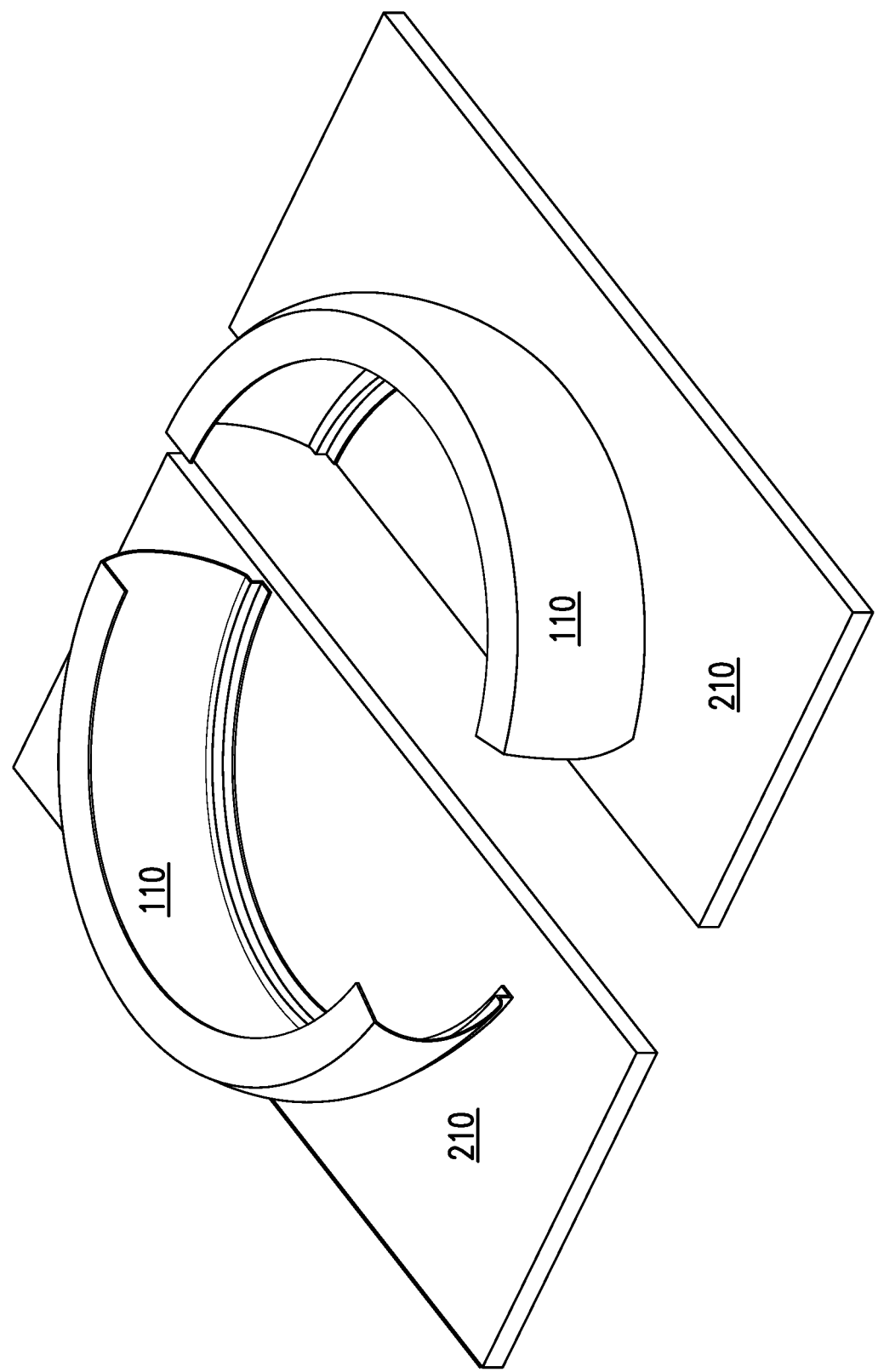

FOOD STAND SYSTEM

NO CLAIM OF PRIORITY

This application is a United States non-provisional application, and does not claim priority to any previous patent or patent application.

FIELD OF THE EMBODIMENTS

This invention relates to food stands and, in particular, to a food stand system with enhanced operational and management features.

BACKGROUND

Food stands are commonly used to provide food, beverages, desserts, and other fare at events such as outdoor celebrations, block parties, and the like. Typically, stands are set up in an ad hoc manner. They are individually placed, provisioned, and operated, often one day at a time, at one event at a time. As such, there are ample opportunities to improve many aspects of managing and operating food stands.

SUMMARY

According to an aspect of the disclosed embodiments, a food stand system is provided comprising a support structure with a flat countertop and a characteristic convex customer-facing surface, defining a compartmental space. A vertical brace is attached to each end forming an end piece. A food preparation appliance is disposed within the compartment, with a sensor operative to measure at least one physical characteristic of the appliance or of food prepared therein. A processor operatively coupled to the sensor executes a procedure using sensed data, for preparing food using the appliance.

It is an object of disclosed embodiments to provide a heating component and a cooling component within the food preparation appliance, arranged to apply a range of temperatures to food prepared therein.

It is an object of disclosed embodiments to provide a platform coupled to the bottom of the support structure, having a power source disposed therein arranged to provide power to the appliance in accordance with an energy management procedure for operating the power source and the appliance. The power source may include a fuel cell that generates power.

It is an object of disclosed embodiments to provide a towable trailer removably coupled to the platform.

It is an object of disclosed embodiments to provide an enclosure coupled to the platform defining a space surrounding the support structure, with a door mounted to the enclosure for entering and exiting the space.

It is an object of disclosed embodiments to provide a semicircular support structure configured to be separable into two parts along a vertical plane, configured to accommodate a serving bar having two ends, each end removably attached to one of the two parts of the support structure. The serving bar may be one of a plurality of serving bars, each configured to be used for a different respective type of event.

It is an object of disclosed embodiments to provide a portable kitchen having at least a cooking surface, a sink with running water, cold storage, and the food preparation appliance; wherein the processor automatically manages the kitchen to provide food service on demand.

It is an object of disclosed embodiments to provide food management software to integrate for food quality and control.

It is an object of disclosed embodiments to provide a back office server configured to send and receive data carrying signals to and from one or more parties interacting with the system, and to process the data received and generate the data sent.

It is an object of disclosed embodiments to provide a customer app to run on a customer device that interacts with the system, the customer app including routines for creating a customer account on the back office server; to log in and out of the customer account, and update customer-related information in the account; to present a menu including food item prices, information, and options; and to provide interfaces for a shopping cart to hold food item selections, to submit the selections as an order, to pay for the order and track its status.

It is an object of disclosed embodiments to provide a seller app to run on a seller device that interacts with the system, the seller app including routines for creating a seller account on the server; to log in and out of the seller account, and update seller-related information in the account; to receive order information submitted by a customer; verify receipt of payment, send a confirmation message to the customer, update the order status, and send order pickup and delivery information to a delivery device running a delivery app.

It is an object of disclosed embodiments to provide a delivery app to run on a delivery device that interacts with the system, the delivery app including routines for creating a deliverer account on the server; to log in and out of the deliverer account, and update deliverer-related information in the account; to receive order delivery information including an order pickup location, a delivery location map, and an order delivery address and phone number; to confirm the order recipient; to send a delivery completed message to the order recipient; and to log an amount of time between order pickup and delivery.

It is an object of disclosed embodiments to provide software to run on the back-office server including routines for accessing all customer-, seller-, and deliverer-input information; to manage a food preparation site including managing inventory, sales information, receivables, and employee time card info. The software may also include routines for updating menu information such as food descriptions, cost, photo, and the like; to manage food stand-related advertisements; to send special offers to mobile devices; to manage promotions such as loyalty cards and points for purchases; and to provide analytics, including sales projections, actual sales, popular items, customer spending habits, and recommendations to improve customer experience. Other functions may include supplier notification of inventory low; order fulfillment; notifications to suppliers; data repository, including accounting, sales, and inventory data; generate reports; and to download data to authorized users in predetermined formats.

BRIEF DESCRIPTION OF THE DRAWINGS

FIG. 2A shows an exemplary embodiment of one section of a food stand disposed on a trailer and ready to be towed.

FIG. 2B shows two portions of a food stand, each disposed on a respective trailer, positioned to facilitate assembly into a single food stand.

FIG. 3A shows the embodiment shown in FIG. 2A with hitch and wheels removed, resting on a flat surface.

FIG. 3B shows two portions of a food stand with hitches and wheels removed.

DETAILED DESCRIPTION

Figure 1:
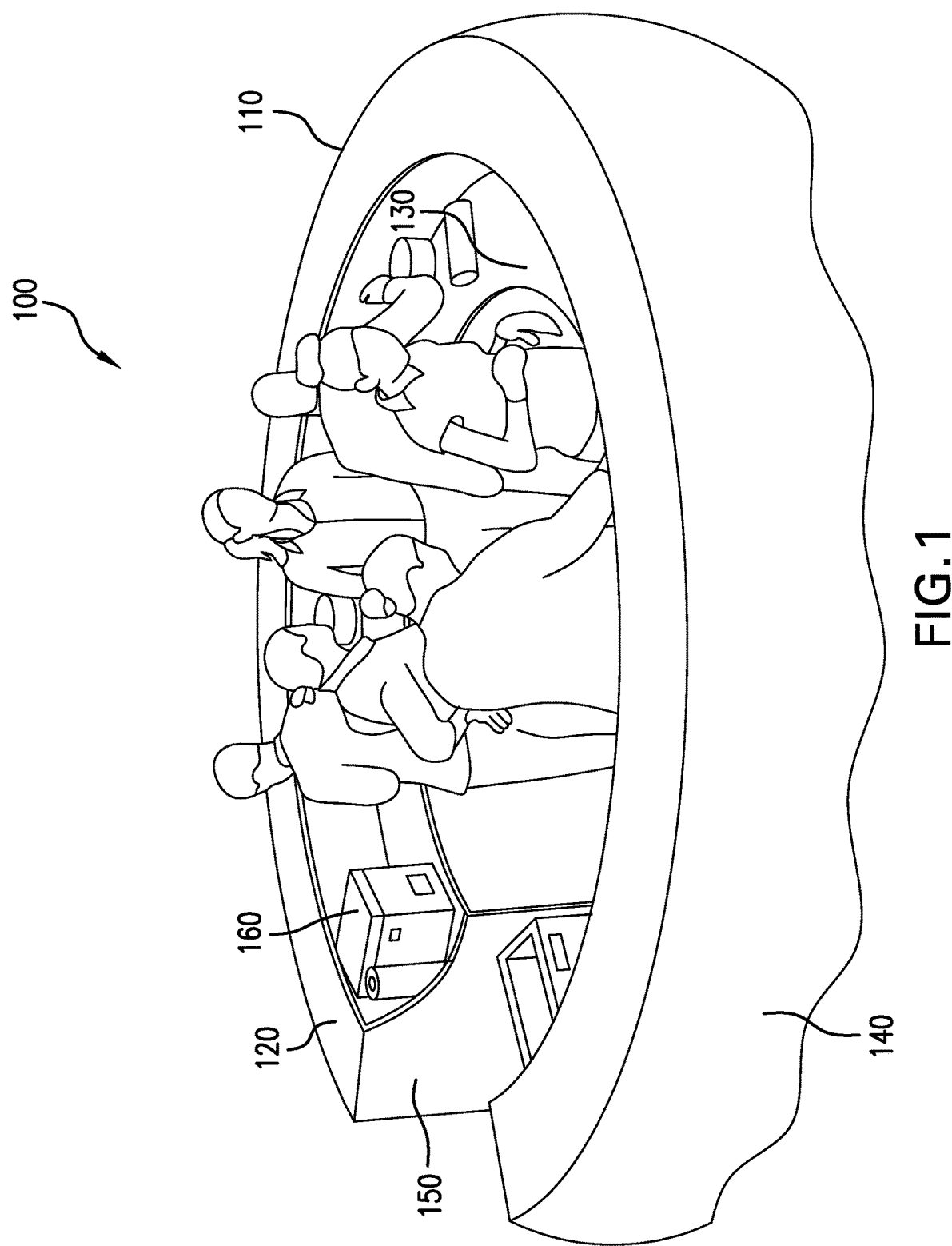
FIG. 1 shows an exemplary embodiment of a food stand in accordance with the disclosure, in operation.

Aspects of exemplary embodiments of the claimed invention will now be described with reference to the drawings, in which identical elements have the same reference numerals. These embodiments are provided by way of explanation of the present invention, which is not intended to be limited thereto. Those of ordinary skill in the art may appreciate upon reading the present specification and viewing the present drawings that various modifications and variations can be made thereto. In addition, it is noted the disclosure pertains to embodiments that may include any of food stands, cafés, food kiosks, and the like. Unless the context indicates otherwise, the term "food stand" may be used herein to refer to any and all such embodiments.

FIG. 1 shows an exemplary embodiment of a food stand 100 in use at an outdoor function. As shown, servers are in the service area to take orders, process transactions, prepare the orders, provide the orders to the customers, and the like.

The configuration shown includes a food stand with a support structure 110 having a circular plan with a gap through which servers can enter and exit. The top of the support structure is flat, and may be used as a countertop 120. A customer-facing "front" surface 140 may have a characteristic convex shape, and the corresponding server-facing "back" surface may have a concave surface. The support structure also has a bottom (not shown). The top, bottom, and back surface together define a compartment. A horizontal shelf 130 is disposed within the compartment adjacent to the back surface. A vertical brace 150 is attached to each end forming an end piece. One or more food preparation appliances 160 may be disposed within the compartment, either sitting on top of the shelf or underneath it. The appliance(s) 160 are each equipped with a sensor (not shown in FIG. 1) operative to measure at least one physical characteristic of the appliance or of food prepared therein. A processor operatively coupled to the sensor executes a procedure using sensed data, such as for directing and managing food preparation using the appliance.

In an embodiment, the food preparation appliance may comprise both a heating component and a cooling component, operatively coupled to sensors that are communicatively coupled to controller components. These may be arranged to provide a large range of temperatures and perform a plurality of functions pertaining to food preparation, including complete temperature management, initiation times, durations, and the like, all of which may be programmed. Controlled and programmed temperatures may include achieving and maintaining freezing, refrigerating, defrosting, cooking, retherming, and holding at a predetermined temperature. These may be used to take frozen food from frozen to ready-to-eat, and may also be used to chill and freeze already cooked or ready-to-eat food.

Referring now to FIG. 2A, an exemplary trailer 200 is shown for transporting the food stand support structure 110 to and from an event such as an outdoor celebration or the like. The support structure 110 may simply be placed on the platform 210 and secured during transport, by straps for example; or the support structure 110 may be removably or permanently coupled to the platform 210, such as with bolts or adhesive. As shown, trailer 200 comprises the platform 210 with support structure 110 disposed thereon, a removable hitch 220 and removable wheels 230. In embodiments, the hitch 220 may be attached at either end of the platform 210. In embodiments, wheels 230 may be designed to be removed when configuring a food stand. Such wheels may be held in place, for example, using removable pins 250, although other mechanisms for attaching and removing the wheels may be used. Scissor jacks 240, or other mechanical or hydraulic jacks, may be used to lower the platform 210 to the ground for configuring a partial or complete food stand, and to raise the platform 210 off the ground for configuration as a trailer.

Figure 2C:
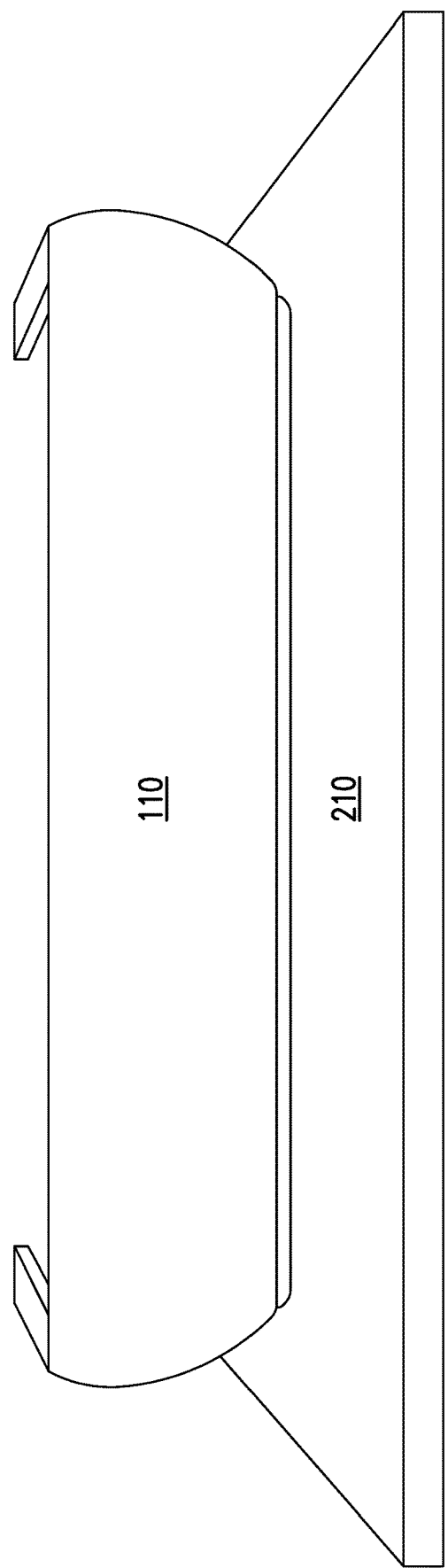
FIG. 2C shows a front perspective view of an exemplary food stand, or a food stand section embodiment, comprising straight sides.

FIG. 2B illustrates two trailers 210 carrying respective support structures 110, that can be arranged to form a single food stand. When configuring the trailers and support structures as a food stand, the trailers can be secured together, for example, using coupling brackets 270 secured at coupling points 260. The support structures similarly may be provided with mechanisms to secure them together. Although two platforms 210 with two support structures 110 are shown, more than two platforms and support structures, having the same or different dimensions and plan views, may additionally or alternatively be used to assemble a food stand with a different configuration. Different support structure plan views can include, for example, portions of conic sections such as a quarter circle or half an ellipse (not shown), or having straight sides meeting at arcuate abutments, as illustrated in FIG. 2C. Of course, support structure segments having other shapes may additionally or alternatively be used.

FIG. 3A shows the platform 210 with hitch and wheels removed and resting on the ground. As shown, the platform 210 may be provided with an open enclosure, for example, comprising a louvered top panel 310 supported by braces 320 attached to the platform 210. The louvers of the top panel 310 may be open as shown, or may be closed (not shown) in embodiments to provide protection from rain and sun. FIG. 3B illustrates a pair of platforms 210 and support structures 110 in position to be pushed together and secured with braces or the like at coupling points, as has been described relative to FIG. 2B.

Figure 4A:
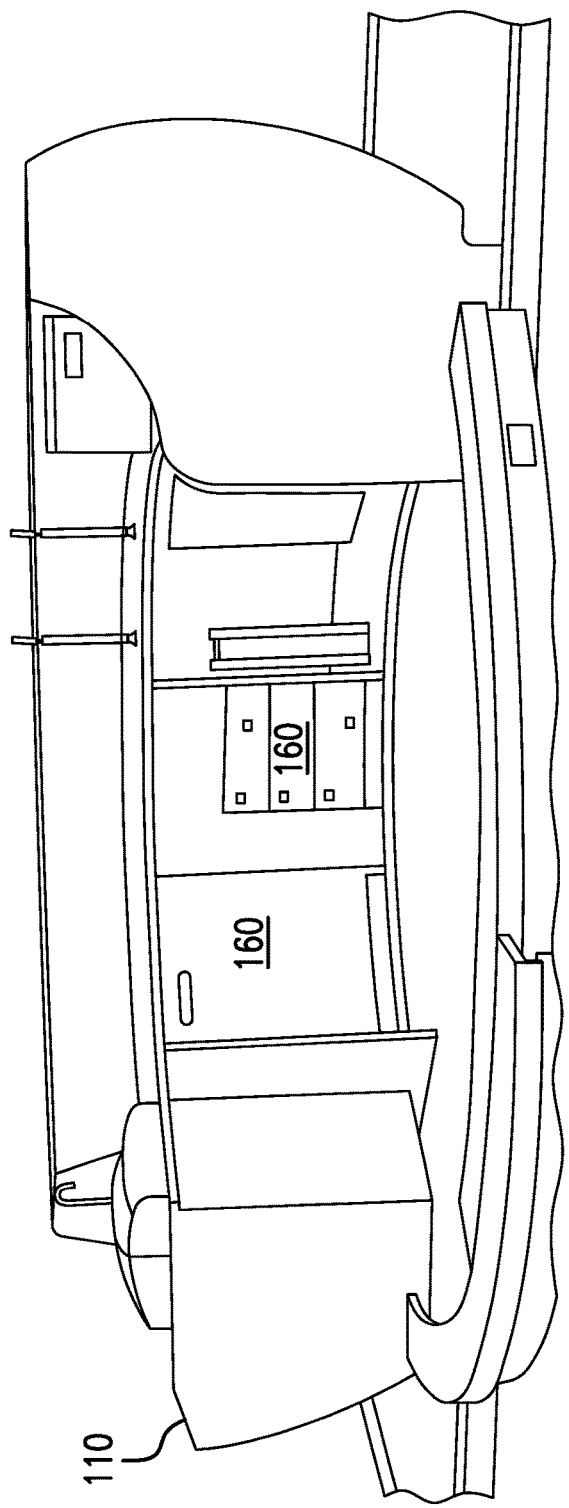
FIG. 4A shows the service area of an exemplary food stand embodiment in accordance with the disclosure.
Figure 4B:
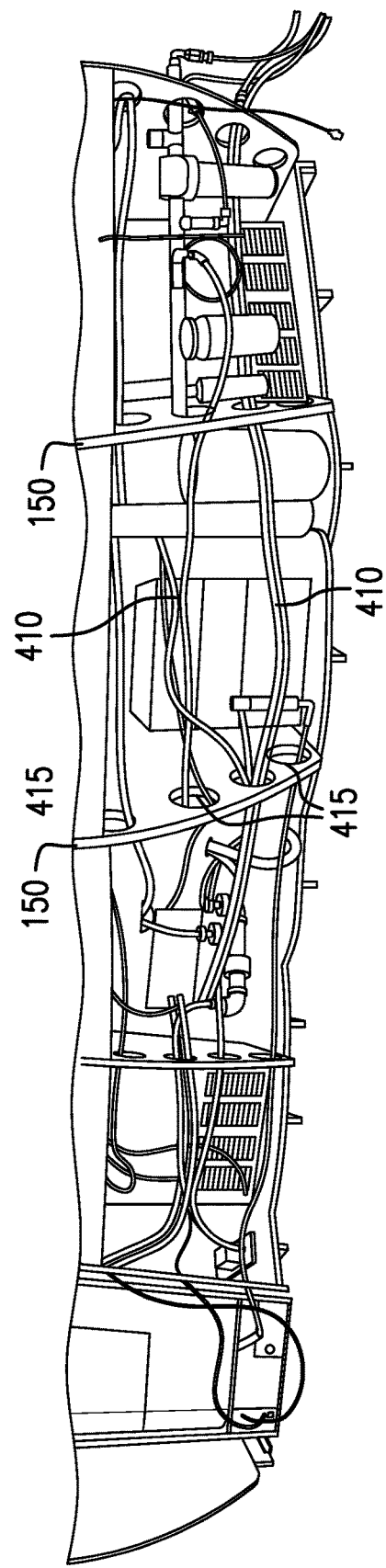
FIG. 4B shows a cutaway view of wiring and piping for devices in an exemplary food stand similar to that shown in FIG. 4A.
Figure 4C:
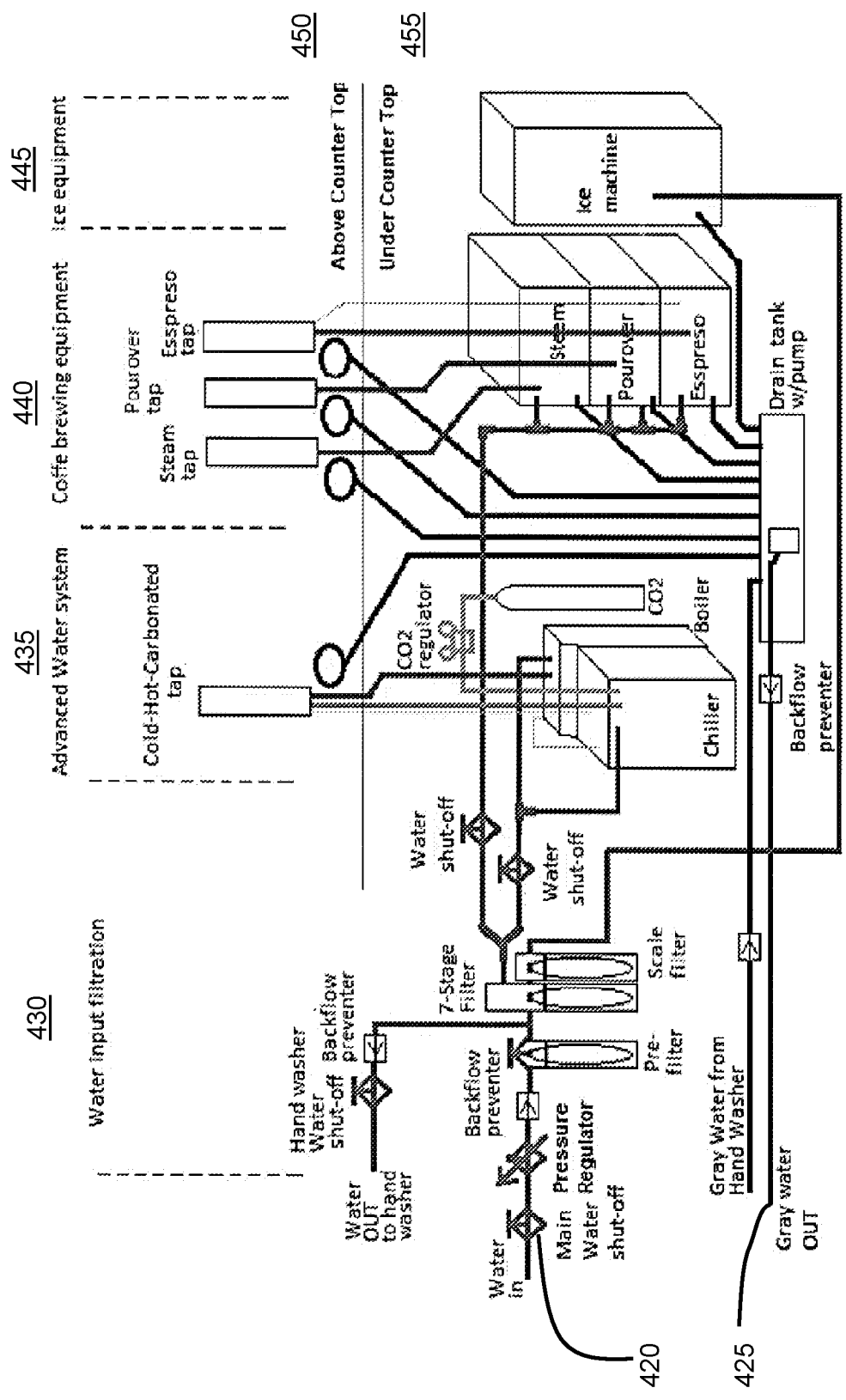
FIG. 4C is a water system diagram of an exemplary food stand in accordance with the disclosure.

FIG. 4A is a rear view of a food stand support structure 110, that has a semicircular plan view. As shown, a plurality of components are disposed within the compartment between the top and bottom of the structure. Those components can include a sink, food preparation appliances, tanks, and the like, that may require power, wiring, and/or piping to be operational. FIG. 4B is a cutaway view showing wiring and piping 410 disposed at the rear of the compartment defined by the structure. Braces 150 are shown positioned as they would be inside the compartment. The braces 150 have holes 415 through which the wiring and piping pass. FIG. 4C is an example of a utility diagram, in this case a water system diagram. As shown, the water is pumped into the system through the main water shut-off valve 420. The diagram shows the flow of water through the system to the gray water outlet 425. The water system provides water to the food stand for functions that can generally be categorized as water input and filtration 430, beverage supply 435 including flat, carbonated, or both, brewing and steaming 440, such as for coffee and espresso, and ice production 445. The taps for the water-based products are disposed above the counter top 450, while the other functional elements are disposed under the counter 455 in the food stand support structure 110, such as chiller, boiler, brewer, etc. Other diagrams (not shown) may show other utilities, such as a wiring diagram (not shown) to show electrical wiring, a network diagram showing network cabling and ports, radio frequency access points and other air interfaces, and the like.

Figure 4D:
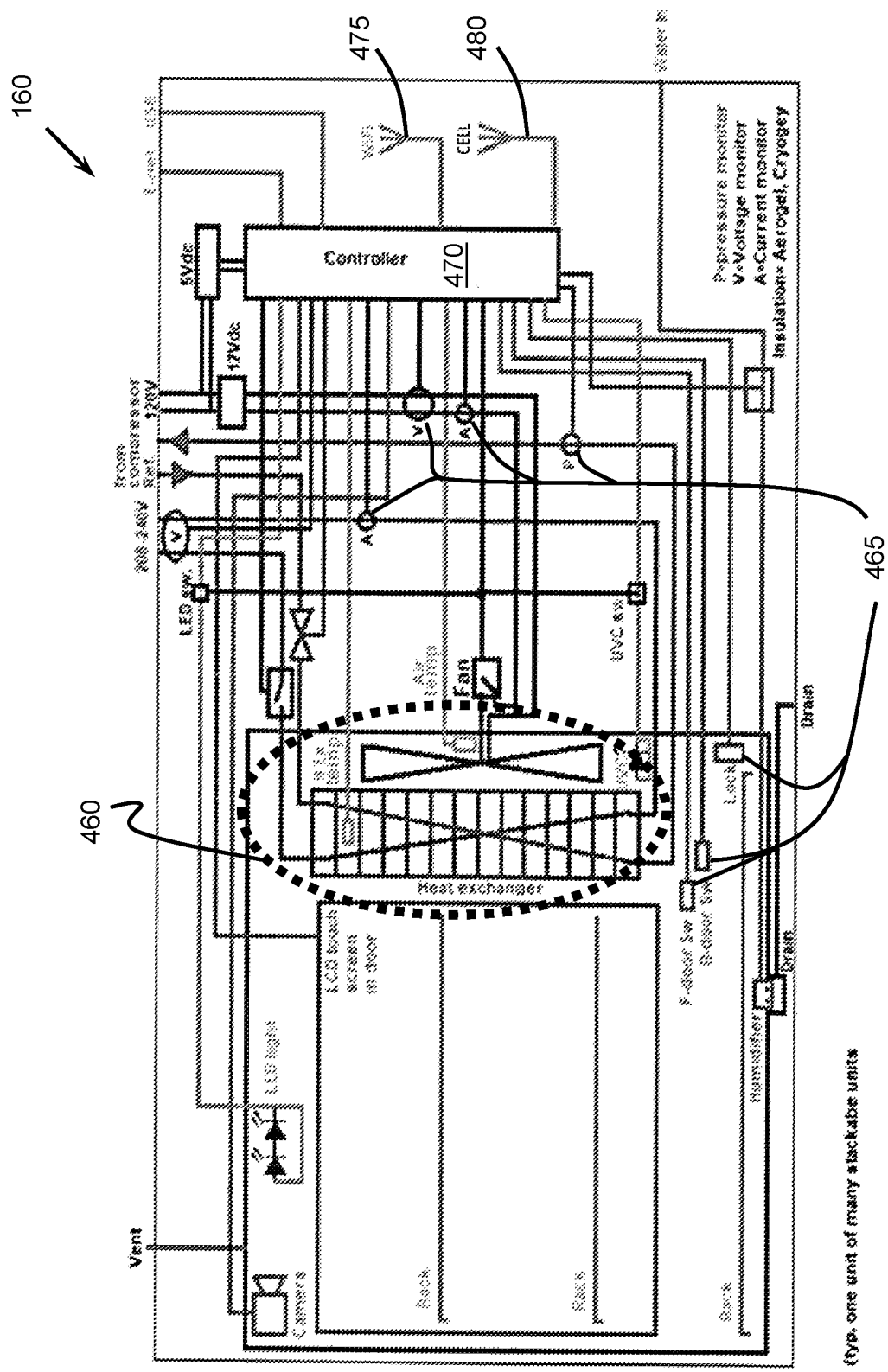
FIG. 4D is a diagram of an exemplary food preparation appliance in accordance with the disclosure.

FIG. 4D is a diagram showing elements of a food preparation appliance 160. In embodiments, the appliance 160 contains sources for both heat and cold to produce a wide range of temperatures, indicated generally by dotted oval 460. A plurality of sensors, switches, and control elements 465 are communicatively coupled to a controller 470. In embodiments, the controller may be communicatively coupled to one or more computing devices, e.g., local devices via a wifi antenna 475, or remote computing devices or servers via a cellular antenna 480, or both. Accordingly, appliance 160 may be fully managed electronically, either locally or remotely, and may be programmable to perform any of its functions in any sequence and time frame. Because the appliance 160 can produce a wide range of temperatures, it is suitable for food preparation activities from cooking through freezing, such as defrosting and heating to ready-to-eat, to holding at a temperature. In an embodiment, the door of the appliance can be locked and unlocked by a customer using an app downloaded and installed onto their computing device, such as a smart phone. This allows the customer to access food within a compartment of the appliance after verification of payment, which may also be an electronic payment effected using the app. Such an appliance may be configured to be stackable, and so may be implemented with any number of compartments as an automart, for example for use in a hotel convenience store, or for staff use unlocked for constant access.

Figure 5:
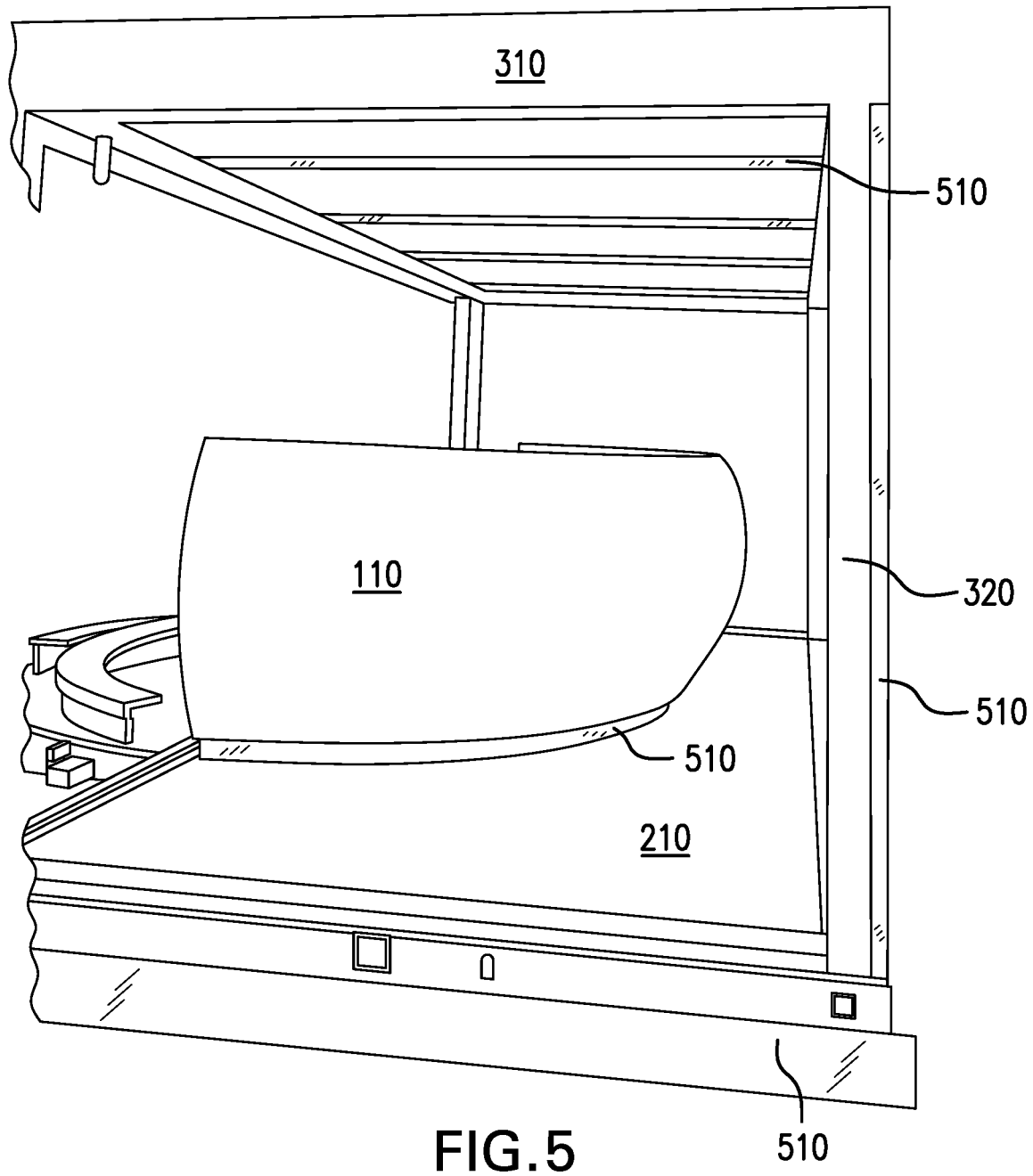
FIG. 5 shows a side view of an exemplary food stand embodiment in accordance with the disclosure.

FIG. 5 is a side view of a food stand embodiment. Here, the support structure 110 has a semicircular plan view and a curved front surface. The platform 210 is resting on the floor, and top panel 310 and supporting braces 320 are also shown. In addition, the illustrated embodiment includes a plurality of lights, such as light emitting diodes (LEDs), disposed at various locations to provide illumination, here including lighting 510 at the bottom of the support structure, under the top panel, along the panel supports, and around the periphery of the platform. The lighting may be selected to have a distinctive appearance, for example, by choosing lights of a particular intensity, color, placement, variability, and the like, which may constitute an identifiable and protectable trade dress.

Figure 6B:
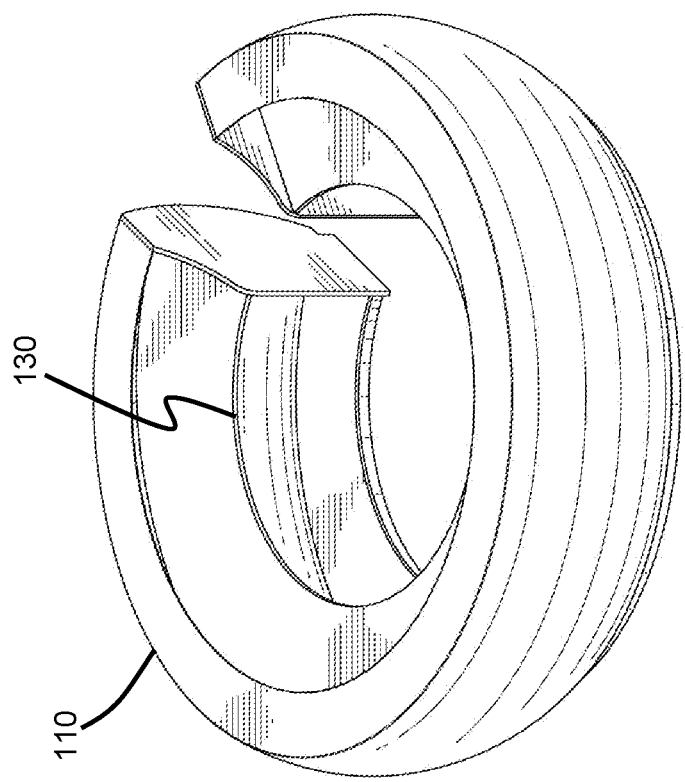
FIGS. 6A and 6B show perspective views of two exemplary food stand configurations in accordance with the disclosure.
Figure 6A:
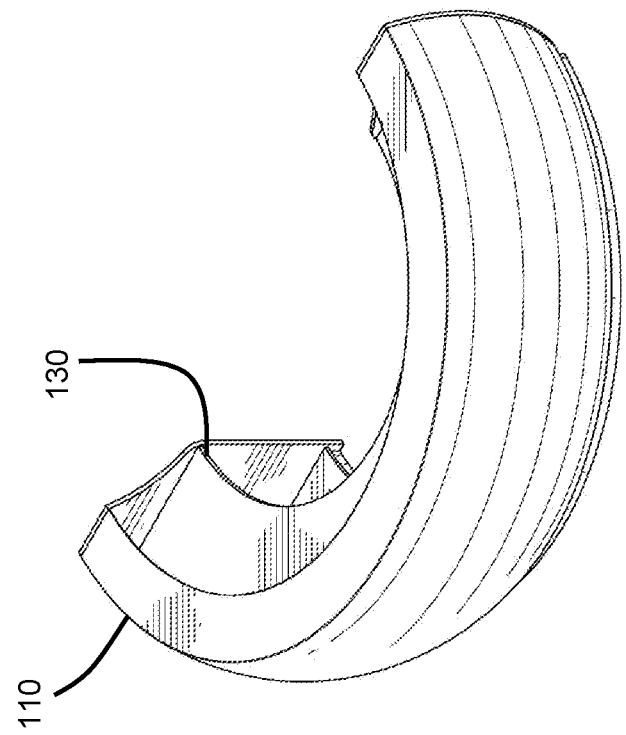

FIGS. 6A and 6B are perspective views of two exemplary food stand support structure configurations. FIG. 6A shows a support structure having a semicircular plan view, whereas the support structure shown in FIG. 6B has a circular plan view, with a gap for entering and exiting the central service area. As shown, both configurations include a shelf 130. Of course, other configurations may be used without departing from the scope of the invention. For example, the support structure may be divisible into a plurality of pieces, with other sections coupled to one or more of them. For example, a semicircular support structure may be divided in half, and a straight food bar section removably inserted therebetween. Or, such alternate configurations may be permanently formed.

Figure 7:
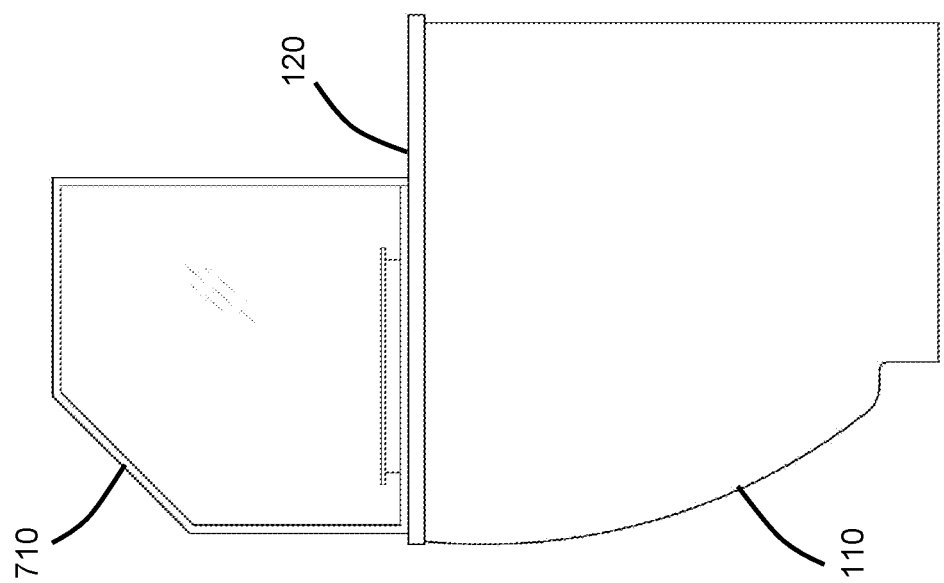
FIG. 7 shows a side view of a portion of an exemplary food stand configuration in accordance with the disclosure.

FIG. 7 is a side view of an exemplary supporting structure having a linear plan view. This embodiment includes a so-called sneeze guard or shield 710 disposed on the countertop 120 to prevent customer contact with items on the countertop or in the server work area. The sneeze shield may simply be placed on the countertop, or may be temporarily or permanently coupled thereto. As shown, the sneeze shield is formed from flat transparent panels.

Figure 8:
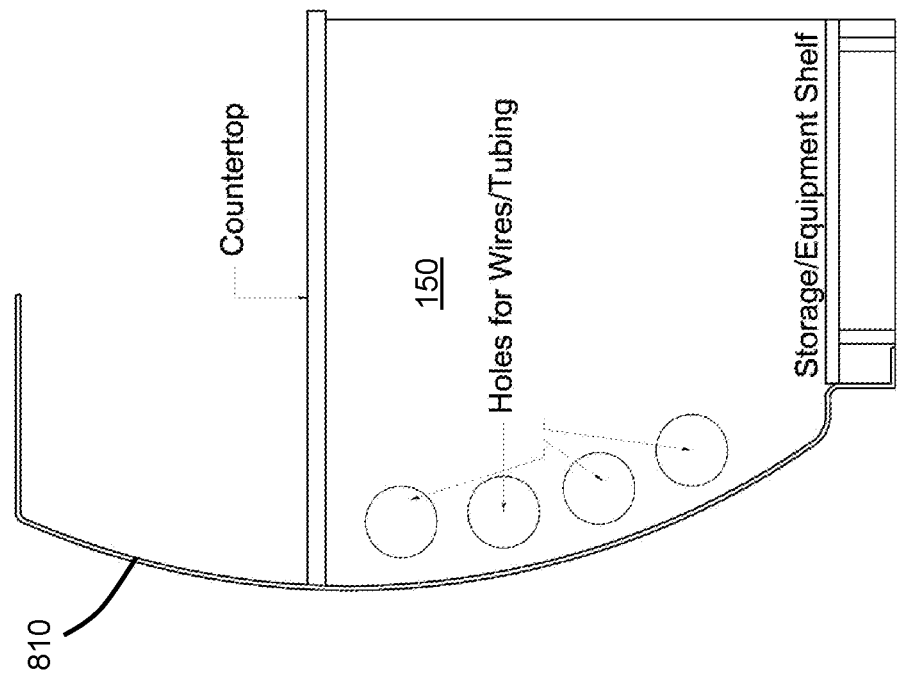
FIGS. 8, 9, and 10 show cutaway side views of exemplary food stand configurations, with and without a transparent enclosure disposed on the countertop, in accordance with the disclosure.

FIG. 8 is a cutaway side view of another embodiment with a sneeze shield 810, in which the sneeze shield has a curved front surface co-extensive with the front surface of the support structure, and a flat top surface. This cutaway view shows a vertical brace 150 with holes that wires and tubing may pass through.

Figure 10:
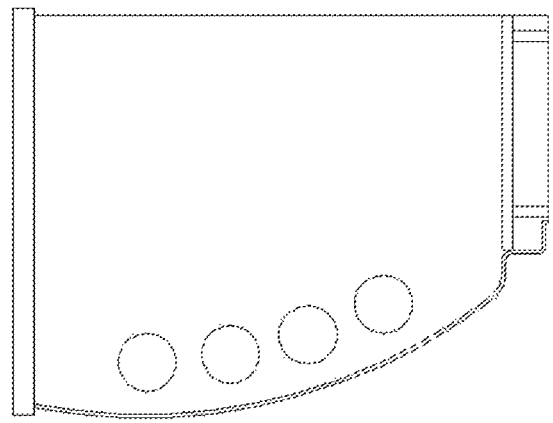
Figure 9:
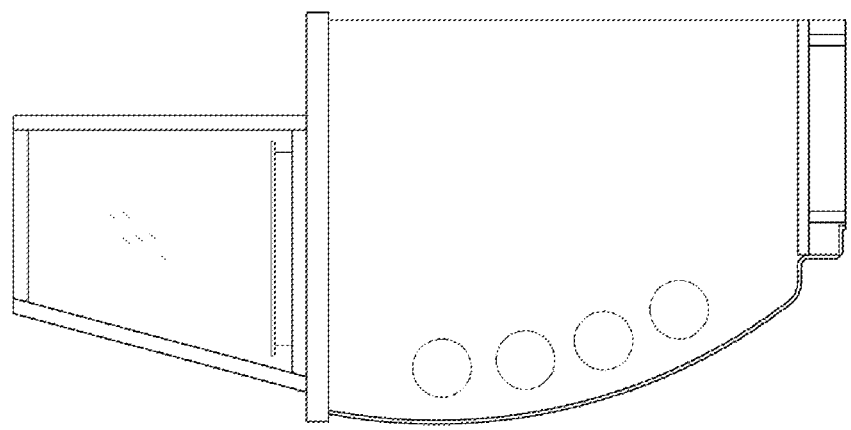

FIG. 9 is a side cutaway view of another exemplary embodiment, wherein the sneeze guard has yet another configuration. FIG. 10 is a side cutaway view of an exemplary embodiment similar to that shown in FIG. 9, but without a sneeze shield. Of course, many other configurations may be used without departing from the scope of the invention.

Figure 11:
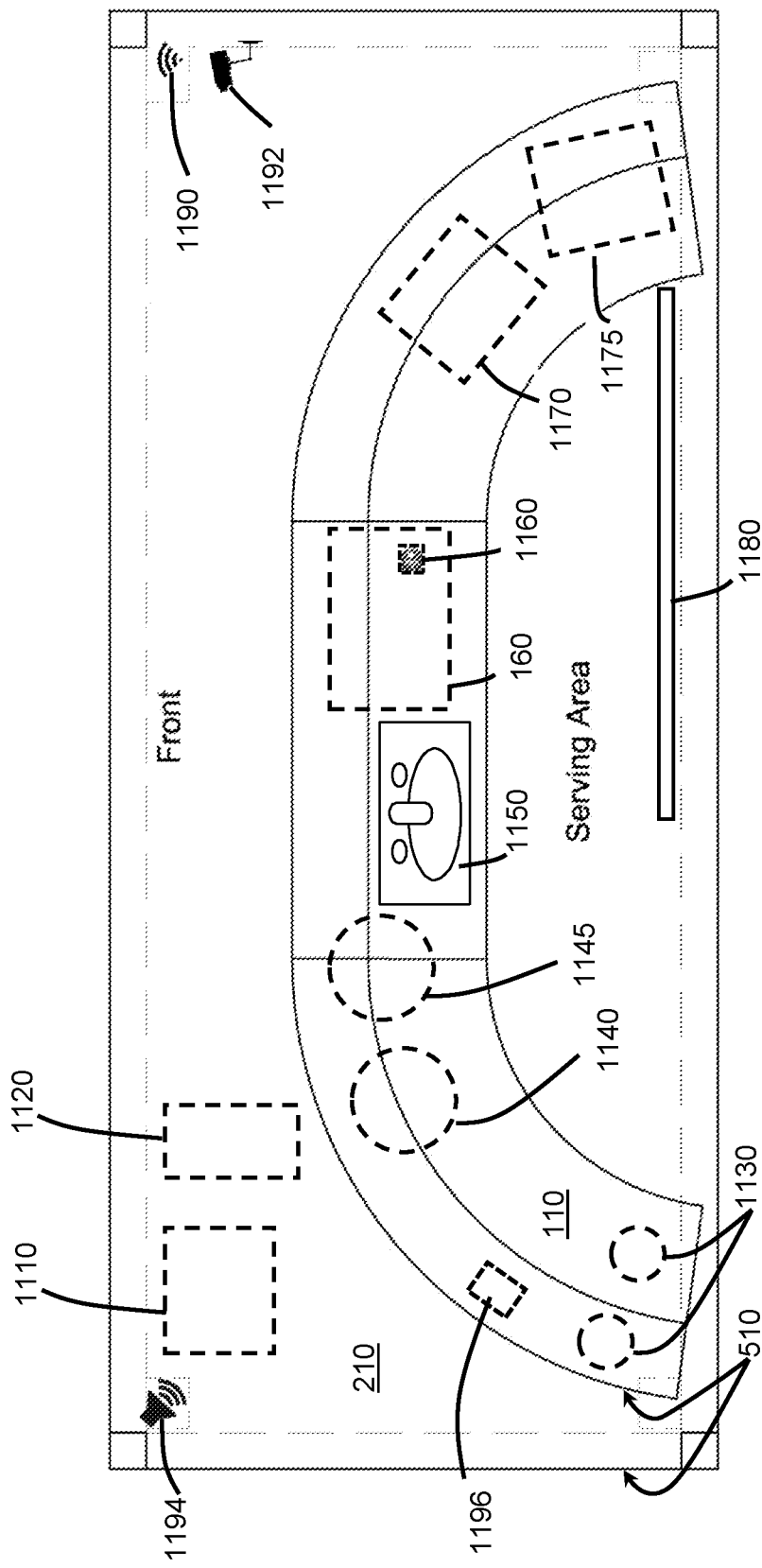
FIG. 11 shows a plan view of an exemplary food stand and platform, in accordance with the disclosure.
Figure 12B:
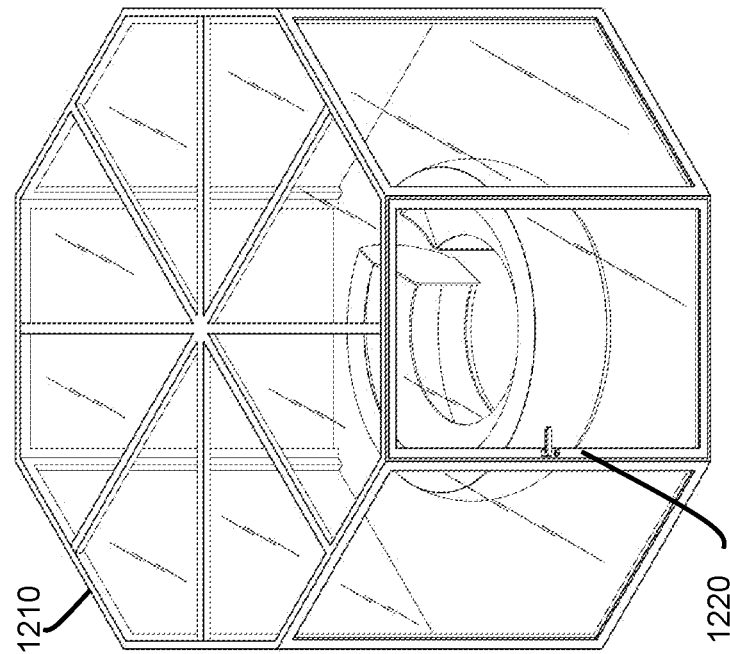
FIGS. 12A, 12B, 12C, and 12D show exemplary food stand enclosure embodiments in accordance with the disclosure.
Figure 12A:
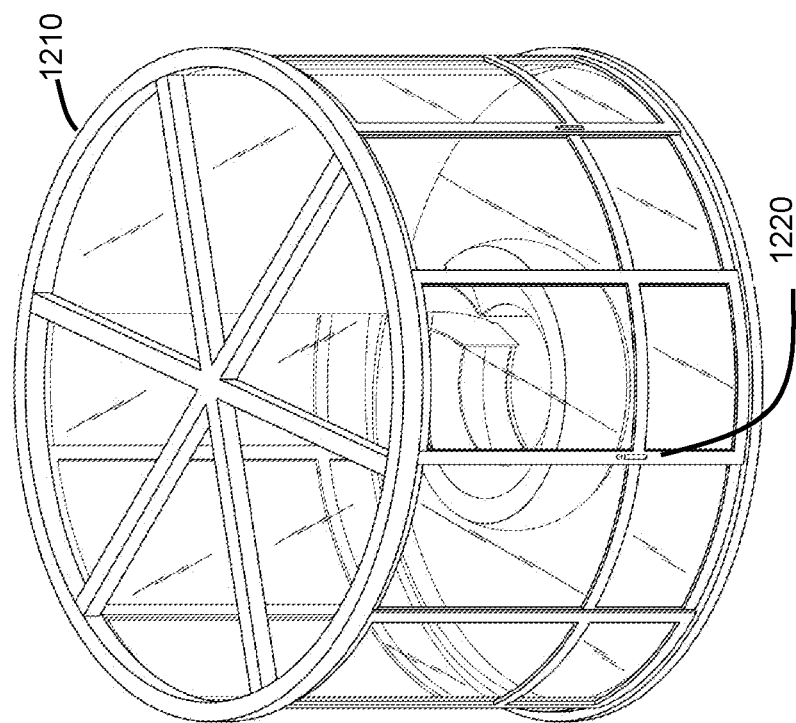
Figure 12D:
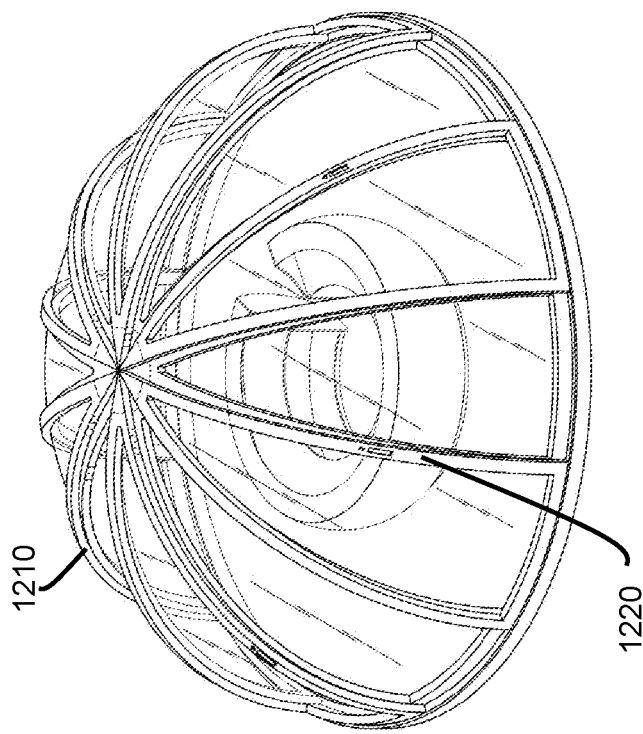
Figure 12C:
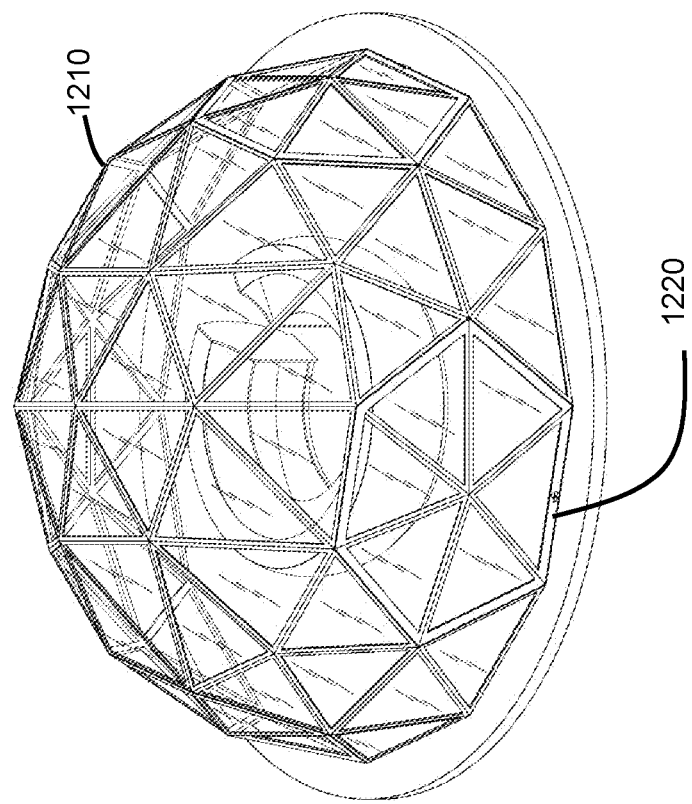

FIG. 11 is a plan view of a food stand embodiment comprising the platform 210, and two curved end sections with a straight section inserted between them. The curved end section may alternatively be coupled together to form a roughly semicircular support structure (not shown). The straight section may be configured as a serving bar having two ends, each end removably attached to one of the two parts of the divided semicircular support structure. The straight central serving bar may be one of a plurality of swappable serving bars, each configured to be used for a different respective type of event, or to provide a different arrangement of components.

As previously described, platform 210 has a power source 1110 disposed therein, arranged to provide power to components of the food stand. For example, the power source 1110 may provide power to the appliance in accordance with an energy management procedure for operating the power source, the appliance, or both. The power source may be or include a fuel cell that generates power from a fuel such as liquefied petroleum gas (LPG, a/k/a propane) or liquefied natural gas (LNG), or another liquid hydrocarbon fuel. In this embodiment, the power source 1110 may provide power directly to energy-consuming components, or it may charge batteries 1120 which may also be disposed inside platform 210 for later power delivery, or both. Regardless, fuel for the power supply 1110 is stored in tanks 1130, which may be disposed under the countertop, or at any other convenient location. Also shown are hot and cold water tanks 1140, 1145, sink 1150, food preparation appliance 160 coupled to one or more sensors 1160, a microwave or other oven 1170, and a refrigerator 1175. Other illustrated power consuming components include LED or other lighting 510, for example disposed at a bottom edge of the support structure 110, the platform 210, or both. Also included may be a flat panel display 1180, a wifi hotspot 1190, a security camera 1192, a speaker or speaker system 1194 powered by an amplifier 1196. In a currently preferred embodiment, flat panel display 1185 can show a menu for viewing by customers, among other things.

Turning now to FIGS. 12A, 12B, 12C, and 12D, a plurality of exemplary enclosures 1210 are shown disposed around or coupled to the platform, defining a space surrounding the food stand support structure. The enclosures are equipped with a door 1220 mounted thereto for entering and exiting the space. Of course, other enclosures and food stand embodiments may be used without departing from the scope of the invention.

In the computer-related disclosure that follows, the terms "component" and "system" may include hardware, a combination of hardware and software, or software executing on hardware, in addition to these terms as used in the foregoing disclosure. For example, a computer-related component may be or include a processor or a process running on a processor, a magnetic disk drive or other data storage drive, a software or data object, an executable program or routine, or the like. By way of illustration, an application running on a computer and the computer can be a component of a system. A component can be localized in one computing device or distributed between a plurality of computing devices.

Furthermore, some or all of the computer-related disclosure may be implemented using standard programming and/or engineering techniques to produce software, firmware, hardware, or any combination thereof to automate and/or control aspects of the disclosed matter. The term "article of manufacture" is intended to encompass a tangible data storage device or medium storing computer readable instructions that cause a computing environment to perform certain actions. For example, a computer readable medium can include a magnetic storage device such as a hard disk, an optical disk such as a compact disk (CD) or digital versatile disk (DVD), a flash memory such as a USB thumb drive, and the like. It should also be appreciated that electrical or electromagnetic signals can be used to convey computer-readable electronic data between network-attached devices. For example, such data carrying signals can be transmitted and received, for example, over a network such as the Internet or a local area network (LAN). Those skilled in the art will recognize many modifications may be made to the following illustrative configurations without departing from the scope or spirit of the claimed subject matter.

Figure 13:
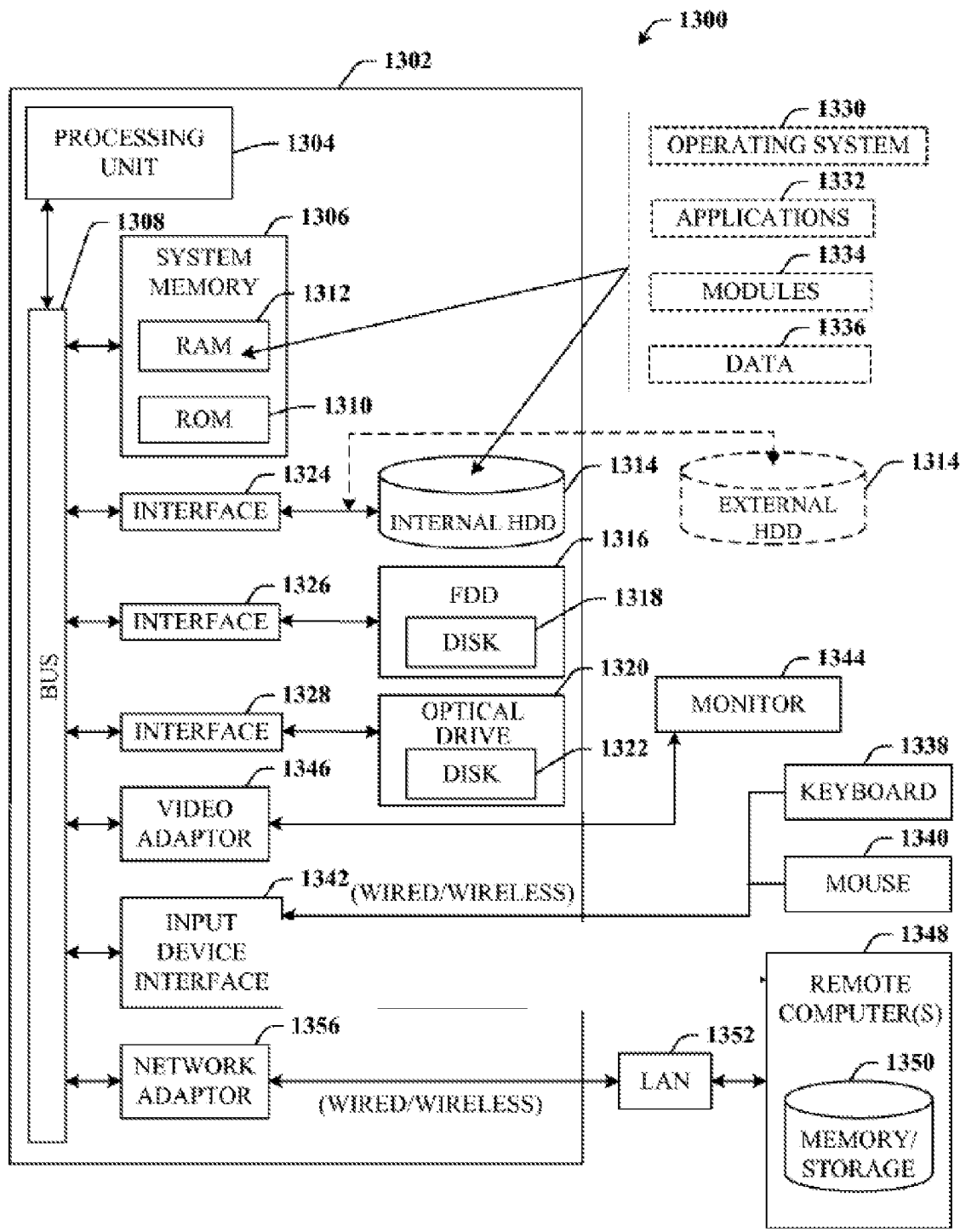
FIG. 13 is a block diagram of exemplary computer components operable to execute aspects of the disclosed system in accordance with the disclosure.

FIG. 13 is a block diagram illustrating an exemplary computing device operable to execute aspects of the disclosed system. In particular, FIG. 13 and the corresponding discussion are intended to provide a brief, general description of a suitable computing environment 1300 in which the various aspects of the claimed subject matter can be implemented. Generally, program modules can include routines, programs, components, data structures, etc., that can be used to perform particular tasks or implement particular abstract data types. However, those skilled in the art will appreciate that other computer system configurations may be used to implement portions of the disclosed subject matter, such as single-processor or multiprocessor computer systems, cloud-based systems, personal computers, hand-held computing devices such as smart phones, microprocessor-based or programmable consumer electronics, and the like, any of which can be operatively coupled to any number of associated devices.

The illustrated aspects of the disclosed embodiments may also be practiced in distributed computing environments in which certain tasks are performed by remote processing devices that are linked through a communications network. In such a distributed computing environment, computer programs or portions of programs can be stored and/or executed locally, remotely, or both.

Referring now to FIG. 13, an illustrative computing environment 1300 for implementing various aspects of the disclosed embodiments includes a computer 1302 having a processing unit 1304, a system memory 1306 and a system bus 1308. The system bus 1308 couples system components including the system memory 1306 to the processing unit 1304. The system bus 1308 may further connect to a memory bus (with or without a memory controller), a peripheral bus such as a universal serial bus (USB), or other local bus using any of a variety of commercially available bus architectures. The system memory 1306 may include read only memory (ROM) 1310 and random access memory (RAM) 1312. A basic input/output system (BIOS) may be stored in a non-volatile memory 1310, such as a ROM, EPROM, EEPROM, or the like. The BIOS contains the basic routines that help to transfer information between elements within the computer 1302, such as during start-up. The RAM 1312 can be or include a high-speed memory such as static RAM for caching data.

The computer 1302 includes one or more data storage devices, such as hard disk drives (HDD) 1314, which may be disposed inside and/or outside of a suitable chassis. As shown, computer 1302 also includes a drive 1316 for use with a removable magnetic storage medium 1318 on which data can be written and read from, and an optical drive 1320 for use with a removable optical disk 1322 such as a CD or DVD. The hard disk drive 1314, magnetic disk drive 1316 and optical disk drive 1320 can be connected to the system bus 1308 via a hard disk drive interface 1324, a magnetic disk drive interface 1326 and an optical drive interface 1328, respectively.

The drives and their associated computer-readable media provide nonvolatile storage of electronic data, data structures, computer-executable instructions, and the like. For example, the media may store computer-executable instructions that, when executed on the processor 1304, cause the computer to perform the automated methods of the disclosed subject matter.

Program modules and the like can be fetched from a nonvolatile storage device and held in RAM 1312 for speedy execution and access, including an operating system 1330, one or more application programs 1332, other program modules 1334, and program data 1336.

Commands and information can be entered into the computer 1302 through one or more wired/wireless input devices, such as a keyboard 1338 and a pointing device 1340. These and other input devices may be connected to the processing unit 1304 through input device interface 1342 coupled to the system bus 1308, which may be a USB port for example. A monitor 1344 or other display device is also connected to the system bus 1308 via an internal or external video interface, such as a video adapter 1346.

The computer 1302 may operate in a networked environment using physical or logical connections via wired and/or wireless communications to one or more remote computers, such as remote computer(s) 1348. The remote computer(s) 1348 can include one or more of a workstation, a server computer, a router, a personal or portable computer, any of which may include some or all of the elements described in connection with the computer 1302. For example, a network attached storage device 1350 is illustrated, and can be accessed by computers and other network attached devices. The logical connections depicted include wired/wireless connectivity to a local area network (LAN) 1352 and can also include larger networks, such as the Internet.

For example, when used in a LAN networking environment, the computer 1302 is connected to the local network 1352 through a wired or wireless communication network interface or adapter 1356. The adaptor 1356 may facilitate wired or wireless communication to the LAN 1352, which may also include a wireless access point disposed thereon for communicating with the wireless adaptor 1356. In a networked environment, program modules depicted with regard to the computer 1302, or portions thereof can be stored in the remote memory/storage device 1350. It will be appreciated that the network connections shown are illustrative and other means of communication between computers can be used.

The computer 1302 may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, telephone). This can include Wi-Fi and Bluetooth wireless technologies, for example. Thus, the communication means can be a predefined structure as with a conventional network or simply an ad hoc communication between at least two devices.

WiFi is a technology for wireless local area networking with devices based on the IEEE 802.11 standards. It can be used, for example, to enable a user communications device to wirelessly connect to a network access point from a short distance away (e.g., 50 feet or more). Wi-Fi networks use radio technologies called IEEE 802.11x (a, b, g, etc.) to provide reliable, fast, securable wireless connectivity. A Wi-Fi network can be used to connect computers to each other, to the Internet, and to other wired and/or wireless networks (which use IEEE 802.3 or Ethernet).

Wi-Fi networks can operate in the unlicensed 2.4 and 5 GHz radio bands or other available bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10 BaseT wired Ethernet networks used in many offices.

Figure 14:
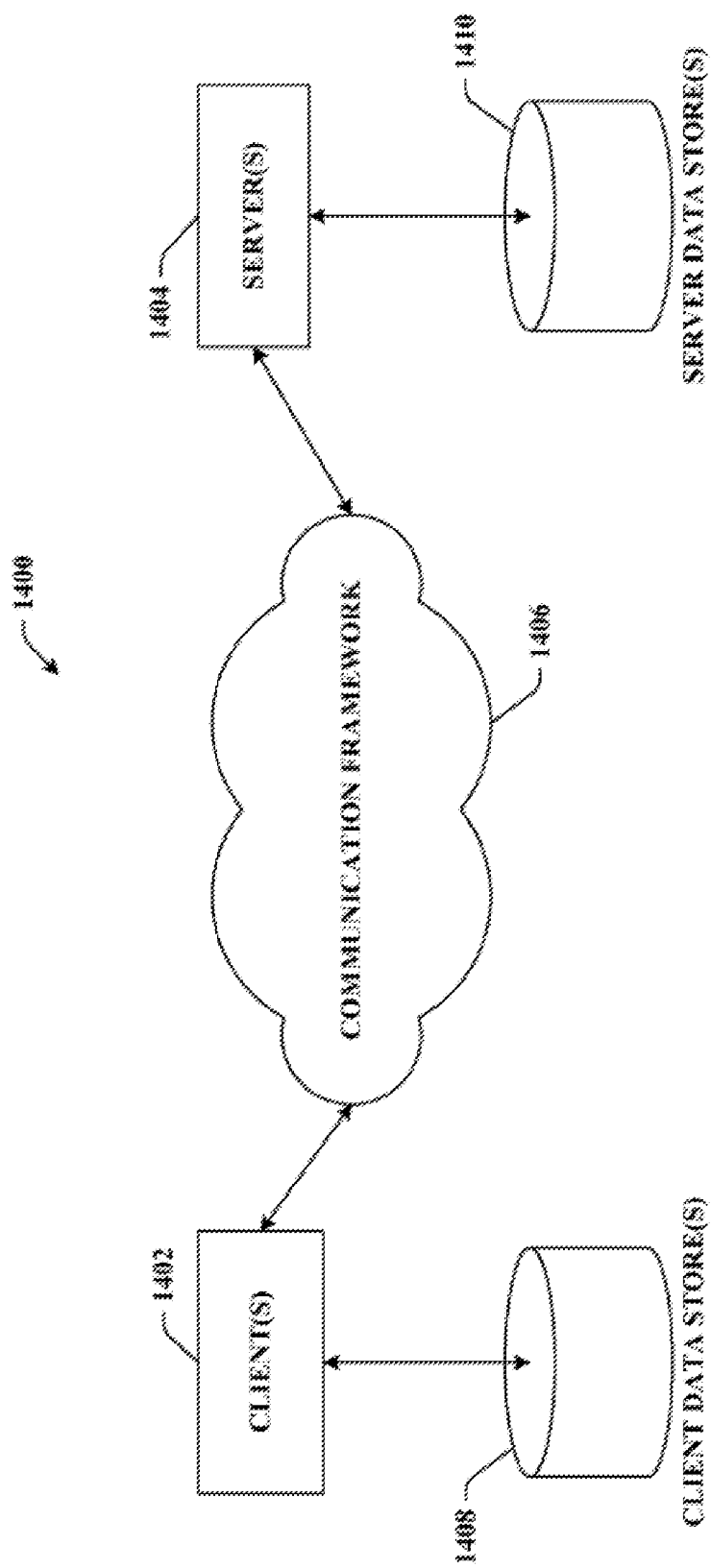
FIG. 14 is a simplified block diagram of an illustrative computing framework suitable for realizing aspects of the disclosed system.

Referring now to FIG. 14, there is illustrated a schematic block diagram of an illustrative computing environment 1400 for processing the disclosed architecture in accordance with other aspects of the disclosed embodiments. The system 1400 includes one or more client computers 1402. The client(s) 1402 can include hardware and/or software (e.g., computing devices, execution threads and other processes). The client(s) 1402 can store location and other contextual information in disclosed embodiments.

The system 1400 also includes one or more server(s) 1404. The server(s) 1404 can also include hardware and/or software (e.g., threads, processes, computing devices). The clients 1402 and servers 1404 can execute threads to perform functions in the disclosed embodiments. For example, communication between a client 1402 and a server 1404 can be in the form of data packets adapted to be transmitted between two or more computer processes. The data packets may include contextual and other information, for example. The system 1400 includes a communication framework 1406 (e.g., a global communication network such as the Internet) that can be used for communications between the client(s) 1402 and the server(s) 1404.

Such communications may be facilitated via a wired (including optical fiber) and/or wireless technology. In embodiments, the client(s) 1402 may be operatively coupled to one or more client data store(s) 1408 that can be employed to store information local to the client(s) 1402. Likewise, the client(s) 1402 and the server(s) 1404 may be operatively connected to one or more server data store(s) 1410 that can be employed to store information local to the servers 1404, or otherwise operatively coupled to the network.

In embodiments, a computing processor may be communicatively coupled to one or more components of the food stand. The processor may automatically manage aspects of the food stand. For example, sensor(s) 1160 may be communicatively coupled to the processor, which may be remotely located in a back office as part of a back office server. In embodiments, the processor may be configured to provide food service on demand, for example, in an automated kiosk embodiment. These and other embodiments may include food management software for execution on the processor to provide for food preparation quality and control.

Figure 15:
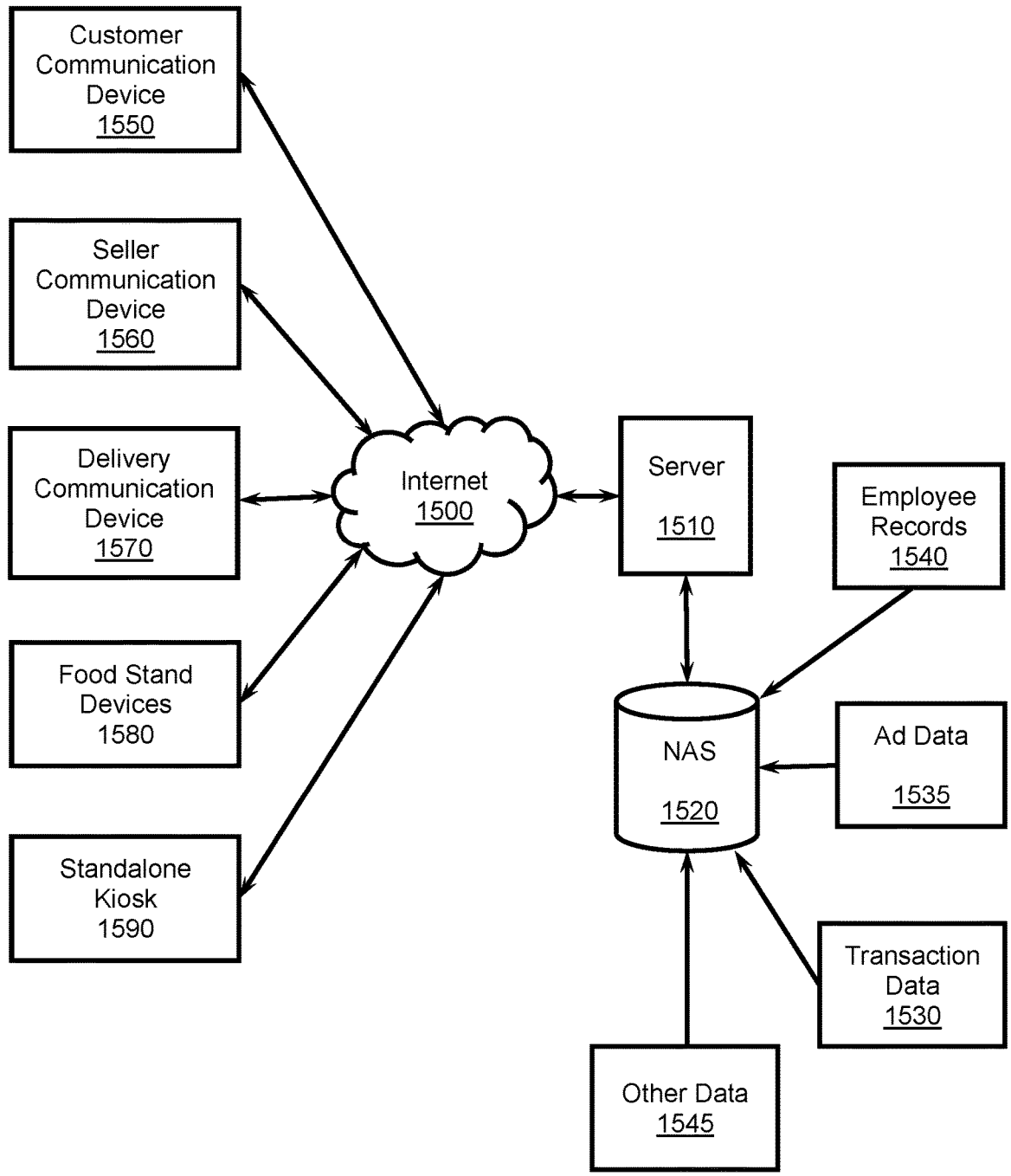
FIG. 15 is a block diagram of an exemplary computing environment for processing aspects of the disclosed system in accordance with the disclosure.

FIG. 15 is a block diagram showing aspects of food stand management system wherein devices from various parties may be communicatively coupled to a back office computing environment, for example, over a network, which may include portions or aspects of the Internet 1500. The back office computing environment may include, for example, a server 1510 operatively coupled to a network attached storage (NAS) device 1520. Data stored in the server or NAS may include transaction data 1530, advertising data 1535, employee records 1540, and other data 1545. Transaction and other data may be communicated to and from the back office server 1510 over the Internet 1500 by various parties' devices, as well as other devices, for example in connection with food stand-related transactions, operations, management, and features. That is, back office server 1510 may be configured to send and receive data carrying signals to and from one or more devices associated with a food stand, and/or devices used by parties interacting with the food stand system, and to process the data received and generate the data sent. For example, devices used by parties to a transaction can include a customer communication device 1550, a seller communication device 1560, and a delivery service communication device 1570.

Back office server 1510 may also be communicatively coupled to various devices 1580 associated with a food stand. These may include, for example, some or all of the powered components described in connection with FIG. 11. Server 1510 may execute routines, for example, to effect efficient operation and management of aspects of embodiments. Server 1510 may provide one or more of corporate access to food stand information, on site management, access to the devices of any number of food stands, inventory control, sales tracking, invoicing and receivables management, employee time card information, individual food stand menu updates including item descriptions, cost, images, and the like. Additional functionality may include food safety controls, food temperature logs, and storing data regarding food sourcing, handling, and chain of custody, such as for compliance to local, state, and federal laws and regulations; status and control of appliance temperatures. Other functionality that may be provided by the back office server may include one or more application programming interfaces, management of advertisements and promotions, and specials communicated to mobile devices of existing or potential customers proximate a food stand, and customer loyalty programs that use cards, points, or the like.

Back office server 1510 may also provide customer data analytics such as sales projections based on actual transactions, identifying popular menu items, customer spending habits, and other analyses calculated to improve customer experience. Automated notifications can also be provided based on various predetermined criteria. For example, orders for supplies can be automatically placed when the amount of particular items in inventory fall below respective predetermined thresholds. Order fulfillment can be tracked and confirmed. Suppliers can even be directed by the back office to deliver specific ordered inventory items to specific food stands. Of course, other common back office functionality related to data storage, notifications to food stand managers if out of compliance range, equipment failures, and the like; and access can also be provided relating to accounting, sales, inventory, report generation, data conversion to predetermined or select formats for export, and the like.

Exemplary embodiments can include one or more fully automated kiosks 1590. These can be operated and managed remotely from the back office. Kiosks can be managed not only to improve operational performance at individual locations, and can also be collectively managed to improve operational performance of a plurality of locations considered as a group.

Figure 16:
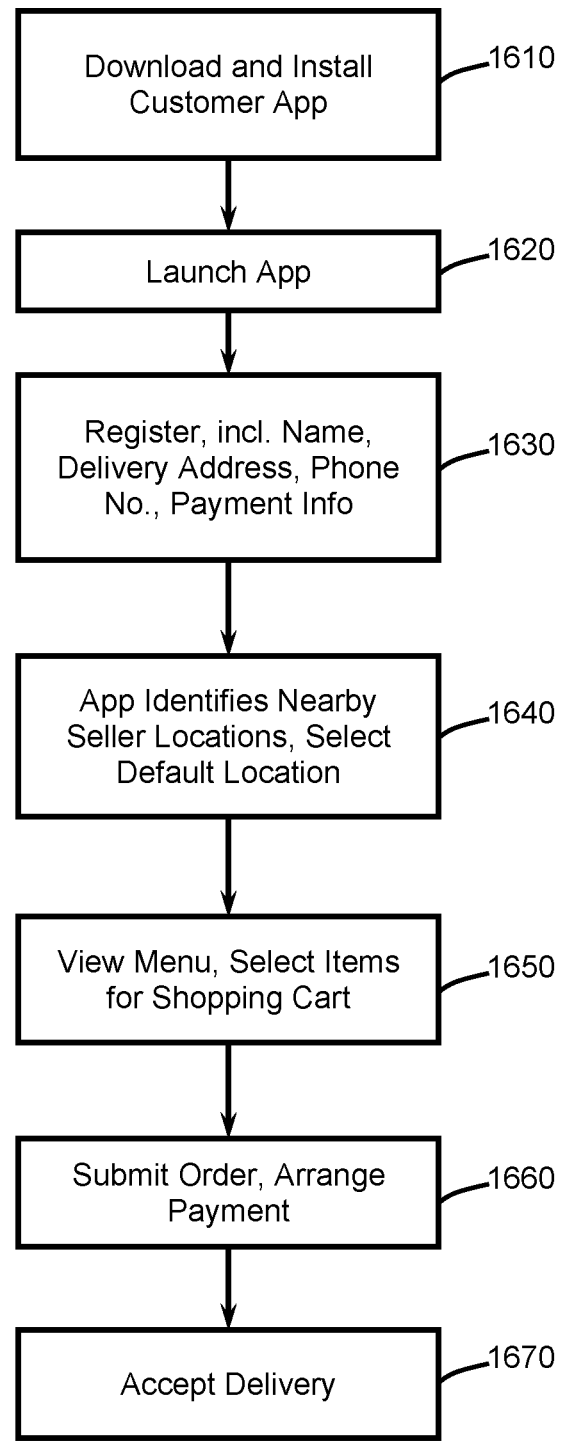
FIG. 16 is a flow diagram of an exemplary method for use by a customer in accordance with the disclosure.

FIG. 16 is a flow diagram showing a method for use with a customer device 1550 that interacts with the food stand system. The method begins with a customer downloading an customer app from an app store and installing it on the customer device, 1610. The customer app includes routines for interacting with the system. After installation, the customer app can be launched 1620. The app can be used by the customer to register with the system by creating a customer account on the back office server 1530. Registration may include the customer providing their name, delivery address, phone number, and payment information, which may be stored on server 1510 or NAS 1520. The app may be able to identify food stand locations near to the customer delivery address for selection by the customer of a default location 1640, which may also be stored with the customer information. The customer can then use the app to log in and out of the customer account and update customer-related information in the account. The customer can also use the app to view a menu of the food stand at the default location, including food item prices, information, and options 1650. The customer can select items from the menu, and hold the selections in a shopping cart. When ready, the customer can submit the selections as an order 1660, and pay for the order. In an embodiment, the customer can track the status of the order using the app until accepting delivery 1670.

Figure 17:
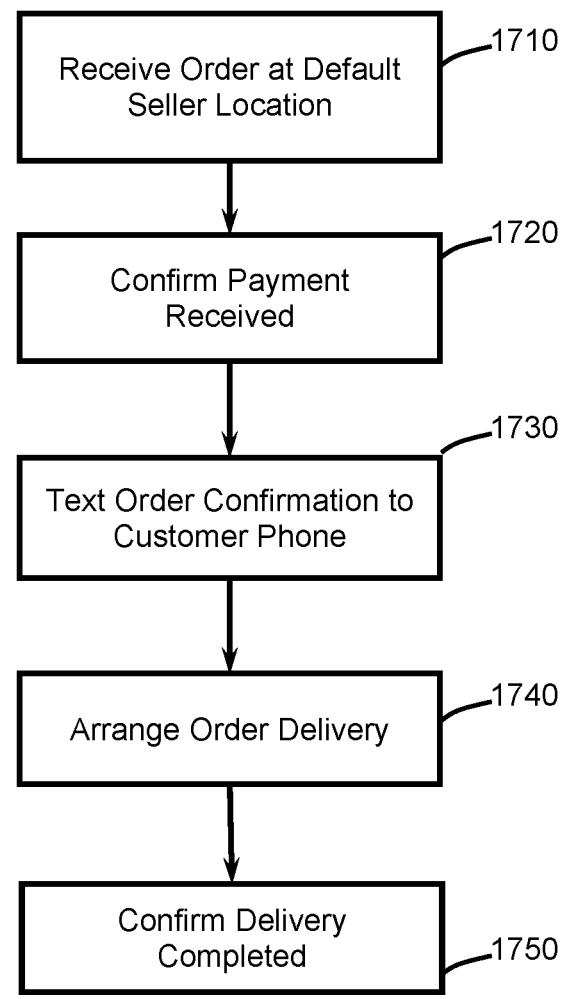
FIG. 17 is a flow diagram of an exemplary method for use by a seller in accordance with the disclosure.

Similarly, FIG. 17 is a flow diagram showing a method for use with a seller device 1560 executing a seller app to interact with the system. The seller app includes routines for creating a seller account on the server; to log in and out of the seller account, and update seller-related information in the account; to receive order information submitted by a customer; verify receipt of payment, send a confirmation message to the customer, update the order status, and send order pickup and delivery information to a delivery device running a delivery app. In particular, the exemplary illustrated method begins when the seller device at the default seller location (or other seller location selected by the customer for this order) receives an order from a customer 1710. Payment for the order is confirmed 1720, and an order confirmation may be texted to the customer's smartphone if applicable 1730. The seller then prepares the order, and arranges order delivery 1740. The seller can receive a confirmation message when delivery is completed 1750.

Figure 18:
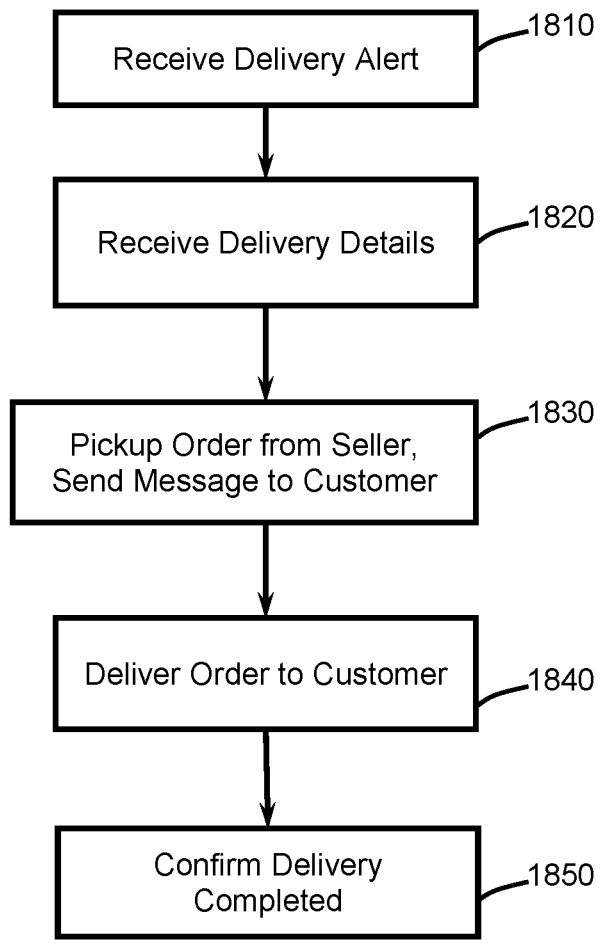
FIG. 18 is a flow diagram of an exemplary method for use by a deliverer in accordance with the disclosure.

FIG. 18 is a flow diagram showing a method for use with a deliverer device 1570 executing a deliverer app to interact with the system. The deliverer app includes routines for creating a deliverer account on the server; to log in and out of the deliverer account, and update deliverer-related information in the account; to receive order delivery information submitted by a seller including an order pickup location, a delivery location map, and an order delivery address and phone number; to confirm the order recipient; to send a delivery completed message to the order recipient; and to log an amount of time between order pickup and delivery; to send a pickup confirmation message to the customer, update the delivery status, and send delivery-related messages. In particular, the exemplary illustrated method begins when the deliverer device 1570 receives a delivery alert 1810 from the seller that an order must be delivered. The deliverer device also receives delivery details 1820. When the order is ready, it is picked up from the seller and an update message is sent to the customer 1830. The order is delivered to the customer 1840, and a message confirming delivery can be sent to at least one of the customer and the seller 1850.

As noted, the back-office server is configured to execute routines for accessing all customer-, seller-, and deliverer-input information; to manage a food preparation site including managing inventory, sales information, receivables, and employee time card info. The software may also include routines for updating menu information such as food descriptions, cost, photo, and the like; to manage food stand-related advertisements; to send special offers to mobile devices; to manage promotions such as loyalty cards and points for purchases; to provide food safety logs and equipment status logs, to change temperatures and settings remotely through wifi or cloud; and to provide analytics, including sales projections, actual sales, popular items, customer spending habits, and recommendations to improve customer experience. Other functions may include supplier notification of inventory low; order fulfillment; notifications to suppliers; storing data including accounting, sales, and inventory data; generate reports; and to download data to authorized users in predetermined formats.

A challenge addressed by disclosed embodiments and aspects include providing an appliance for easy and efficient preparation of food. As noted, the appliance can be controlled and programmed either locally or remotely. Because it includes both a source of heat and a source of refrigeration, it is capable of handling all temperature cycles from frozen to cooked and ready-to-eat. In embodiments, the appliance is also easy to load with frozen foods, cooks the food, and keeps it warm until it's time to eat. In embodiments, inventory can be stocked, locked, and accessed by access code permission. In embodiments, access may be provided to customers via a vending application that communicates with the appliance 160.

In an embodiment, one aspect of the appliance 160 may be realized as a sous vide oven appliance (not shown), preferably disposed undercounter in a food stand, or on a wall in a vending application such as hotel lobbies, convenience stores, or offices. In embodiments, the appliance 160 may comprise one or more compartments such as drawers. Each compartment may have abilities independent of the others, including at least a refrigeration component capable of freezing and cooling functions, and a heating component capable of high temperature baking and lower temperature warming. The heating may be provided with or without convection, and with or without humidity functions. Venting may be provided from each drawer through a one way valve. If a plurality of vents are provided, all can terminate in the same vent pipe. In embodiments, an electronic module is provided for controlling all functions. The module can be configured to control a single drawer, or a plurality of drawers. Controlled and/or programmable functions can include freezing, thawing, cooling, baking, and warming; humidity, temperature, date, time, function start and/or stop time(s), function duration, sequences of functions, and storing function sequences as programs. The electronic module may be programmable for all functions, defined independently, and controllable locally or remotely via a control panel coupled to the appliance, or via a PC, Tablet, Smartphone, etc., or as part of the so-called Internet of things (IoT), with a wired or wireless interface.

In embodiments, a prepared food packaging pan may have a barcode reader or the like that identifies packaged food item(s) for preparation in the appliance. The barcode may be used, for example, to define a programming regimen for proper preparation of a barcode-identified prepackaged food container. The identity of such prepackaged food containers that have been prepared using the appliance can be recorded and saved for inventory tracking, and for automatically reordering/replenishing prepackaged food supplies.

In embodiments, each compartment may include safety features such as over/under temperature limit, smoke detection and mitigation, $CO/CO_2$ concentration detection and mitigation, automatic water fill/drain, electrical supply over/under voltage, ground fault detection/interruption, etc. The appliance is constructed using any suitable durable materials and insulation to withstand temperature extremes from deep freezing to baking and self-cleaning.

Each compartment may be accessible via a swing out door or a pullout drawer. The appliance may be configured to have a select number of compartments or chambers. The chambers may have the same or different dimensions. In embodiments, the appliance can be configured to be placed on a countertop or shelf, or in a cabinet or other compartment, or it can be configured for under counter or cabinet installation, or in-wall installation. In embodiments, a plurality of chambers may be stackable and/or reconfigurable.

In the foregoing, when introducing disclosed embodiment(s) or aspects thereof, the articles "a," "an," and "the" are intended to mean that there are one or more of the elements or aspects. Similarly, the adjective "another," when used to introduce an element, is intended to mean one or more elements. The terms "including" and "having" are intended to be inclusive such that there may be additional elements other than the listed elements.

Although the embodiments have been described with a certain degree of particularity, it is to be understood that the foregoing disclosure has been made only by way of illustration and not limitation. Numerous changes in the details of construction and arrangement of parts may be made without departing from the spirit and the scope of the invention as defined by the appended claims.

What is claimed is:

1. A food stand system comprising: a support structure with a semicircular plan view having two ends, with a flat top surface as a countertop, a bottom, and a front surface permanently coupled therebetween defining a convex customer-facing surface (outside) and a concave server-facing surface (inside), the space defined by the top, bottom, and front of the support structure defining a compartment;
    a vertical brace attached to each respective end forming an end surface disposed between the bottom of the support structure and the countertop; a food preparation appliance disposed within the compartment;
    a sensor coupled to the food preparation appliance, the sensor operative to measure, as sensed data, a physical characteristic of the appliance or of food prepared using the appliance; and
    a processor operatively coupled to the sensor and configured to process the sensed data in accordance with instructions stored in a tangible data storage device in data communication with the processor, the instructions defining a procedure using the sensed data for preparing food using the appliance.

2. The system as recited in claim 1, further comprising: a heating component and a cooling component within the food preparation appliance, arranged to apply a range of temperatures to food prepared in the appliance.

3. The system as recited in claim 1, further comprising: a platform coupled to the bottom of the support structure; a power source disposed inside the platform and arranged to provide power to the appliance; and instructions stored in the data storage device defining an energy management procedure for operating the power source and the appliance.

4. The system as recited in claim 3, further comprising a towable trailer removably coupled to the platform.

5. The system as recited in claim 3, wherein the power source includes a fuel cell that generates power.

6. The system as recited in claim 3, further comprising: an enclosure coupled to the platform defining a space surrounding the support structure; and a door mounted to the enclosure for entering and exiting the space.

7. The system as recited in claim 1, wherein the semicircular support structure is configured to be separable into two parts along a vertical plane, further comprising: a serving bar having two ends, each end removably attached to one of the two parts of the support structure.

8. The system as recited in claim 7, wherein the serving bar is one of a plurality of serving bars, each configured to be used for a different respective type of event.

9. The system as recited in claim 1, further comprising a portable kitchen having: a cooking surface; a sink with running water; a refrigerator; the food preparation appliance; and instructions stored in the storage device which, when executed by the processor, manage the kitchen to provide food service on demand.

10. The system as recited in claim 9, further comprising instructions stored in the storage device as food management software to integrate for food quality and control.

* * * * *